(12) United States Patent
Uesugi et al.

(10) Patent No.: US 7,958,367 B2
(45) Date of Patent: Jun. 7, 2011

(54) AUTHENTICATION SYSTEM AND APPARATUS

(75) Inventors: Tadaoki Uesugi, Sagamihara (JP);
Takahiro Fujishiro, Yokohama (JP);
Takeshi Akutsu, Kawasaki (JP);
Hisanori Mishima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 674 days.

(21) Appl. No.: 12/149,026

(22) Filed: Apr. 25, 2008

(65) Prior Publication Data

US 2008/0301457 A1 Dec. 4, 2008

(30) Foreign Application Priority Data

May 30, 2007 (JP) ................................. 2007-143650
Dec. 13, 2007 (JP) ................................. 2007-322103

(51) Int. Cl.
*H04L 9/32* (2006.01)
*H04N 1/44* (2006.01)
(52) U.S. Cl. ......... 713/178; 713/168; 713/176; 380/246
(58) Field of Classification Search .................. 713/150, 713/168, 176, 178, 189, 193, 194; 726/21; 380/246; 709/201–203
See application file for complete search history.

(56) References Cited

U.S. PATENT DOCUMENTS 6,188,766 B1 * 2/2001 Kocher .......................... 380/246
7,689,827 B2 * 3/2010 Sibert ............................ 713/176
2005/0229011 A1 10/2005 Ebringer et al.

FOREIGN PATENT DOCUMENTS

JP 2005-301550 10/2005

OTHER PUBLICATIONS

Adams, C. et al., "Internet X. 509 Public Key Infrastructure Time-Stamp Protocol," Request for Comments (RFC) 3161, Aug. 2001.
"TPM Main Part 1 Design Principles: Specification Version 1.2 Revision 94," Trusted Computing Group, Incorporation, Mar. 29, 2006.

* cited by examiner

*Primary Examiner* — Gilberto Barron, Jr.
*Assistant Examiner* — Abdulhakim Nobahar
(74) *Attorney, Agent, or Firm* — McDermott Will & Emery LLP

(57) ABSTRACT

When a document creation unit 1 is started, it calculates a hash value of each software piece therein and stores the hash value in a hash value holder 71 and a measurement log document holder 44. The document creation unit 1 accesses a time distribution unit plural times to receive time information therefrom, and records the time information in a log document and a measurement log document. The document creation unit 1 transmits the log document, the measurement log document, and digital signature-embedded hash value information (measurement auxiliary document) in a tamper-resistant device 63 to a document reception device. The document reception device verifies matching of the hash values or digital signature in the document group, confirms software operating environments in the document creation unit 1 from the hash values, and determines whether the time information is correctly managed within the unit 1.

6 Claims, 24 Drawing Sheets

FIG.2

| | | | 6 |
|---|---|---|---|
| Taro. | Image1.img. | DECEMBER 2, 2006 | 5:31 |
| Hanako. | Image2.img. | DECEMBER 2, 2006 | 10:35 |
| ⋮ | ⋮ | ⋮ | ⋮ |
| 2006/12/02 12:00:00 TIME CONFIRMATION | | | |
| ⋮ | ⋮ | ⋮ | ⋮ |
| Yoko. | Image4.img. | DECEMBER 2, 2006 | 13:03 |
| ⋮ | ⋮ | ⋮ | ⋮ |
| 2006/12/03 12:00:00 TIME CONFIRMATION | | | |
| ⋮ | ⋮ | ⋮ | ⋮ |
| Shiho. | Image2.img. | DECEMBER 4, 2006 | 2:55 |
| ⋮ | ⋮ | ⋮ | ⋮ |
| 2006/12/04 12:00:00 TIME CONFIRMATION | | | |
| ⋮ | ⋮ | ⋮ | ⋮ |

7 (bracket grouping middle rows)

FIG. 3

| | | | | | |
|---|---|---|---|---|---|
| PCR[11], 6 | COMPANY A | Sample | /usr/sample/sample | 3q0jnbyhn0bnrgsn5 | |
| ⋮ | | ⋮ | ⋮ | ⋮ | |
| 2006/12/02 12:00:00 | | | | | |
| ⋮ | | ⋮ | ⋮ | ⋮ | |
| PCR[16], 1 | COMPANY B | TABLE CALCULATION | /usr/lib/App1/module1.so | AΘebeoz9ebm30sa | |
| PCR[16], 2 | COMPANY B | TABLE CALCULATION | /usr/lib/App1/module2.so | 5nbKΘqlka054mq0bs | |
| ⋮ | | ⋮ | ⋮ | ⋮ | |
| PCR[17], 1 | COMPANY B | ANTI-VIRUS | /usr/bin/App3/test | uAosBoima03vhbifsa | |
| ⋮ | | ⋮ | ⋮ | ⋮ | |
| PCR[19], 132 | COMPANY C | Browser X | /usr/lib/App6/sample | 84jnb6ni3q0b9o4hg | |
| 2006/12/03 12:00:00 | | | | | |
| ⋮ | | ⋮ | ⋮ | ⋮ | |
| PCR[13], 14 | COMPANY D | SUPER DOCUMENT CREATION | /usr/share/App5/spacial5 | 390bno0qhnp9a;as | |
| ⋮ | | ⋮ | ⋮ | ⋮ | |
| PCR[15], 26 | COMPANY D | IMAGE ANALYSIS SOFTWARE | /usr/bin/App6/module0.so | I9vBno4w0stzjldbn | |
| ⋮ | | ⋮ | ⋮ | ⋮ | |
| 2006/12/04 12:00:00 | | | | | |
| ⋮ | | ⋮ | ⋮ | ⋮ | |

| | |
|---|---|
| PUR[16] | 58bos90w40hwji0 |
| | |
| | u7a3mb9hla02akb8 |
| | 2006/12/02 12:00:00 |
| PCR[0] | Aogwhrn0kslspga |
| PCR[1] | a83nahcnoe93qn |
| ⋮ | ⋮ |
| PCR[12] | badi73nagb8oejw |
| ⋮ | ⋮ |
| PCR[19] | cazlg04hmn0tenldf |
| | a93hrgee09jhnb04 |
| | 2006/12/03 12:00:00 |
| ⋮ | ⋮ |
| PCR[21] | 98hmn0pephkw |
| ⋮ | ⋮ |
| | 2006/12/04 12:00:00 |
| ⋮ | ⋮ |

11 brackets PCR[0] through PCR[19]
12 points to a93hrgee09jhnb04

FIG.5

| MANAGEMENT APPLICATION A | |
|---|---|
| Ver 10,5,61 | |
| OCTOBER 3, 2005 | |
| SOFTWARE X CO., LTD | |
| /usr/lib/App1/module1,so | togwhrn0ks1spga |
| /usr/lib/App1/module2,so | u83nahcnae93qn |
| ⋮ | ⋮ |
| /usr/bin/App1/app_start | mtb8wnjbf93jbios |
| qj9gaepn810bnmae | |

SOFTWARE TO BE INCLUDED

- COMPANY A, TIME DISTRIBUTION UNIT
- ACCESS CLIENT
- COMPANY B, TIME MANAGEMENT SOFTWARE
- CAMPANY C, TPM-CORRESPONDING DIGITAL
- SIGNATURE SOFTWARE
- COMPANY D, ANTI-VIRUS
  - ・
  - ・
  - ・
  - ・

SOFTWARE NOT TO BE INCLUDED

- COMPANY M, FILE SHAING SOFTWARE
- KEY LOGGER X
- LOG TAMPER SOFTWARE Y
  - ・
  - ・
  - ・
  - ・

FIG.14

| | | | | 130 |
|---|---|---|---|---|
| Taro. | Image1.img, | 2006/12/03 | 5:31 | |
| Hanako. | Sample.doc | 2006/12/03 | 10:35 | |
| ⋮ | ⋮ | ⋮ | | |
| 2006/12/03 12:00:00 TIME CONFIRMATION | | | | |

| | | | | |
|---|---|---|---|---|
| ⋮ | | ⋮ | | ⋮ |
| PCR[4],154 | – | PTS | /lib/PTS/QQ | B8oNst2no3Gqh0v |
| PCR[16],1 | COMPANY C | TimeClient | /usr/lib/TimeC/XXX5.so | A8ebaoz9ebm30sa |
| PCR[16],2 | COMPANY C | TimeClient | /usr/lib/TimeC/XXX2.so | Snb8qlka054mq0bs |
| | | ⋮ | | |
| PCR[16],131 | COMPANY A | webserver | /usr/webserv_A/ZZZ1.so | ufba8ouma03vhbifsa |

| PCR[16],1 | COMPANY C | TimeClient | /usr/lib/TimeC/XXX5.so | S8mjve90sWaB7L |
| PCR[16],2 | COMPANY C | TimeClient | /usr/lib/TimeC/YYY2.so | 5nb8qlka054mq0bs |
| PCR[16],131 | COMPANY A | webserver | /usr/webserv_A/ZZZ1.so | ufbs8oima03vhbifsa |

244

| PCR[0] | IPgno3Ng7bneE |
| PCR[3] | 9DmAqobe0g2U3 |
| PCR[4] | ja83nGoFs0ahgq |
| PCR[16] | 8Ag0OGW5wSv |
| | a93hngea08hnb04 |

Hash16_cal ←→ INTEGRITY VERIFICATION

FIG. 25

| | | | | | |
|---|---|---|---|---|---|
| | ⋮ | | | ⋮ | 241 |
| PCR[16],1 | COMPANY C | TimeClient | /usr/lib/TimeC/XXX5.so | S8mjve90sWaB7L |
| PCR[16],2 | COMPANY C | TimeClient | /usr/lib/TimeC/YYY2.so | 5nb8qlka054mq0bs |
| | ⋮ | | | ⋮ | |
| PCR[16],35 | COMPANY C | TimeClient | /usr/lib/TimeC/CBA | 8noh4pMra0jbsWra |
| PCR[16],36 | COMPANY A | webserver | /usr/webserv_A/ZZZ5.so | Yg0wpojHPbn6ub0 |
| | | | | | |
| PCR[16],131 | COMPANY A | webserver | /usr/webserv_A/ZZZ1.so | ufbs8oima03vhbifsa |

| | |
|---|---|
| TimeClient | |
| Ver 3.10.2 | |
| 2004/05/25 | |
| C CO., LTD | 245 |
| XXX1.so | d98g4wb0j3qpg8R |
| ⋮ | ⋮ |
| XXX5.so | S8mjve90sWaB7L |
| ⋮ | ⋮ |
| CBA | jvo23Na09vajpd5E |
| oj9gaepn810bnmae | |

# AUTHENTICATION SYSTEM AND APPARATUS

INCORPORATION BY REFERENCE

This application claims priority based on Japanese patent applications, No. 2007-143650 filed on May 30, 2007 and No. 2007-322103 filed on Dec. 13, 2007, the entire contents of which are incorporated herein by reference.

BACKGROUND OF THE INVENTION

The present invention relates to a technique for allowing a managed unit, such as a document creation unit, which receives a time from a time distribution unit, to indicate authenticity of the time when transmitting a document with an additional record of the time to a managing unit, and a technique for allowing a managing unit receiving a document from a managed unit to determine whether the managed unit operates according to a system manager's intention.

At present, as many terminals automatically incorporate time information in all types of data while maintaining the time information, the time information is recorded in almost all electronic documents. However, in current systems, a user using a terminal or unintended software of the user may readily tamper time information on the terminal or time information recorded in a document, thereby making it difficult for an electronic document creator to assure an electronic document recipient of authenticity of a time.

A technique, called a timestamp, to solve the above problem is disclosed in RFC3161 Timestamp Protocol (referred to hereinafter as Document 1). According to this technique, when an electronic document is given and received between an electronic document creator and an electronic document recipient, the electronic document creator transmits the electronic document to a third party that provides a timestamp service, and the third party additionally records time information in the electronic document, executes a digital signature to the electronic document and sends the electronic document back to the electronic document creator, so that the electronic document creator can indicate to the electronic document recipient that the electronic document has been present at a time corresponding to the time information, and assure the electronic document recipient that the electronic document has not been tampered. Also, the electronic document recipient needs to know in advance that the time granted to the electronic document by the third party is accurate information.

On the other hand, a system manager must often determine from a remote site whether a unit under management thereof operates as it is supposed to. For example, in order to trust log information created by a certain unit, the manager has to determine whether a group of software modules creating the log information operate correctly. One means for realizing this is a Trusted Computing technology using a Trusted Platform Module (TPM). For example, means for verifying that software in a unit is not tampered, using the TPM, is disclosed in Japanese Patent Laid-open Publication No. 2005-301550 (referred to hereinafter as Document 2). According to this document, a certain unit stores hash values of all software operating therein in an auxiliary storage unit, such as a hard disk drive (HDD), and the TPM and then sends all the hash value information to a separate unit nearest to the manager, thereby enabling the manager to verify reliability of a unit located at a remote site.

SUMMARY OF THE INVENTION

In the above-mentioned timestamp service, when the electronic document created by the electronic document creator is an electronic document in which plural time information are recorded, such as a log document, a document creation unit has to be coupled to a third party unit whenever one time information is to be recorded. For this reason, as the number of time information to be recorded in the electronic document increases, the amount of traffic between the document creation unit and the third party unit increases, resulting in a reduction in transmission efficiency of other communications. Also, because the document creation unit performs communication frequently, it cannot operate other applications at normal speed. In addition, because the third party executes the digital signature frequently, the returning of the electronic document from the third party unit to the document creation unit is delayed, resulting in a large amount of time being required for the electronic document creator to create the electronic document.

Also, in the above Document 2, the certain unit has to acquire and keep hash values of all software modules existing therein. For this reason, in the case where the certain unit is a terminal having an insufficient writable storage capacity, such as a specific-purpose dedicated unit, a specific mobile phone or a personal computer (PC) having no HDD, it may have difficulty in keeping all the hash value information. Moreover, when the certain unit is coupled to a network with a very narrow band, it may take a considerable amount of time to send all the hash value information to a counterpart unit.

The present invention provides an authentication system and apparatus in which an electronic document creator assures an electronic document recipient of authenticity of time information recorded in an electronic document without being coupled to a third party unit and without execution of a digital signature to the electronic document by the third party unit whenever the electronic document creator records the time information in the electronic document.

The present invention provides an authentication system and apparatus in which, even in the case of using a unit having an insufficient writable storage capacity or a unit coupled to a network with a very narrow band, a manager verifies that the unit operates correctly.

According to one preferred embodiment of the present invention, an authentication system includes a managed unit equipped with a tamper-resistant device having a data read/write/storage function, a digital signature function, and a tamper-resistant function, and having a network coupling function, a data and time information read/write/storage function, a function of increasing time information stored therein at regular intervals, a function of calculating hash values of all software modules running therein when it is started, a function of storing the hash values in a storage area of the tamper-resistant device, and a function of storing the hash values and information for identification of the hash values in a storage area thereof, a managing unit having a network coupling function, a data read/write/storage function, a function of verifying authenticity of a digital signature, a function of verifying authenticity of a public key certificate, a function of calculating hash values, and a function of comparing the contents of two documents to determine whether they are the same, and a time distribution unit having a network coupling function, and a data storage function.

The managed unit calculates hash values of all software modules running therein when it is started, stores the hash values in the storage area of the tamper-resistant device, stores the hash values and information for identification of the hash values in the storage area thereof, stores the time information increasing at the regular intervals in the storage area thereof, creates an electronic document, additionally records the stored time information in the electronic document, accesses the time distribution unit to receive the latest time information therefrom, overwrites the stored time information with the latest time information, additionally records the latest time information in the electronic document, and, immediately after additionally recording the latest time information in the electronic document, transmits log information to the tamper-resistant device to request it to execute a digital signature.

In response to the request, the tamper-resistant device combines the hash values stored in the storage area thereof to create one piece of measurement auxiliary information, executes a digital signature with respect to combined information of the received log information and the measurement auxiliary information using a key held in the device, and sends the measurement auxiliary information, a digital signature value and a public key certificate corresponding to the key back to the managed unit.

Also, the managed unit creates a measurement auxiliary document with the measurement auxiliary information and digital signature value received from the tamper-resistant device and the latest time information. The measurement auxiliary document is digital signature-embedded hash value information. Then, the managed unit transmits a log document with a combination of log information, a measurement log document with a combination of the hash values and hash value identification information stored in the storage area, the measurement auxiliary document, and the public key certificate to the managing unit.

Also, the managing unit receives the log document, measurement log document, measurement auxiliary document and public key certificate over a network. This managing unit performs integrity verification with respect to the measurement log document by verifying authenticity of the digital signature granted to the received measurement auxiliary document, verifying authenticity of the public key certificate, verifying whether there is no contradiction between the hash values recorded in the measurement log document and the hash values recorded in the measurement auxiliary document, which is digital signature-embedded hash value information, verifying whether plural hash values recorded in a reference measurement document stored in a storage area of the managing unit and the hash values recorded in the measurement log document are all equal, and verifying whether the measurement log document violates a security policy stored in the storage area of the managing unit.

According to another preferred embodiment of the present invention, an authentication system includes a managed unit equipped with a tamper-resistant hardware device having a data read/write/storage function, a digital signature function, and a tamper-resistant function, and having a network coupling function, a data and time information read/write/storage function, a function of calculating hash values of all software modules running therein when it is started, a function of storing the hash values in a storage area of the tamper-resistant device, and a function of storing the hash values and information for identification of the hash values in a storage area thereof, and a managing unit having a network coupling function, a data read/write/storage function, a function of verifying authenticity of a digital signature, a function of verifying authenticity of a public key certificate, a function of calculating hash values, and a function of comparing the contents of two documents to determine whether they are the same.

In this authentication system, the managed unit, before communication with the managing unit, shares information with the managing unit in association with a class of information held in the storage area of the managed unit and the storage area of the tamper-resistant device and a class of information to be transmitted from the managed unit to the managing unit. Upon being started, the managed unit holds information based on the information sharing in the storage area thereof and the storage area of the tamper-resistant device and transmits only the held information to the managing unit.

Also, in this authentication system, the managing unit, after receiving a network coupling request from the managed unit, determines whether information in the storage area of the tamper-resistant device, received during previous communication with the managed unit, is held in the managing unit. When the information in the storage area of the tamper-resistant device, received during the previous communication with the managed unit, is held in the managing unit, the managing unit requests the managed unit to transmit, to the managing unit, the information held in the storage area of the tamper-resistant device, and a document created by the managed unit. When the information in the storage area of the tamper-resistant device, received during the previous communication with the managed unit, is not held in the managing unit, the managing unit requests the managed unit to transmit, to the managing unit, the information held in the storage area of the managed unit, the information held in the storage area of the tamper-resistant device, and the document created by the managed unit.

Also, in this authentication system, when the information in the storage area of the tamper-resistant device, received during the previous communication with the managed unit, is held in the managing unit, the managing unit verifies whether the information held in the managing unit and the information held in the storage area of the tamper-resistant device, newly received from the managed unit, are equal. The managing unit accepts the document created by the managed unit when the information held in the managing unit and the information held in the storage area of the tamper-resistant device are equal. When the information held in the managing unit and the information held in the storage area of the tamper-resistant device are not equal, the managing unit requests the managed unit to transmit the information held in the storage area of the tamper-resistant device, the information held in the storage area of the managed unit, and the document created by the managed unit.

In an authentication system according to one application embodiment of the present invention, even when plural time information is recorded in an electronic document, there is no increase in traffic of communication from a document creation unit which is a managed unit. Also, a digital signature is not executed by a third party unit, load on the document creation unit does not increase, and the document creation unit can assure a document reception unit of authenticity of the time information recorded in the electronic document.

In an authentication system according to another application embodiment of the present invention, a manager of a managed unit having an insufficient writable storage capacity can verify that the unit operates correctly. Also, a manager of a managed unit coupled to a network with a very narrow band can verify that the unit operates correctly. Further, in a managing unit which verifies that the managed unit operates correctly, a smaller amount of time than a conventional one can be required for the verification process execution.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 is a view illustrating a log document (electronic document) created by a document creation unit 1 of the first embodiment.

FIG. 3 is a view illustrating a measurement log document created by the document creation unit 1 of the first embodiment.

FIG. 4 is a view illustrating a measurement auxiliary document created by the document creation unit 1 of the first embodiment.

FIG. 5 is a view illustrating a reference measurement document stored in a document reception unit 3 of the first embodiment.

FIG. 6 is a view illustrating a security policy set by a manager or user of the document reception unit 3 of the first embodiment.

FIG. 14 is a view illustrating a log document created by a managed unit 1 of the second embodiment, which is a document creation unit.

FIG. 15 is a view illustrating a measurement log document created by the managed unit 1 of the second embodiment.

FIG. 24 is a view illustrating the contents of integrity verification B of the second embodiment.

FIG. 25 is a view illustrating the contents of integrity verification C of the second embodiment.

DETAILED DESCRIPTION OF THE EMBODIMENTS

Now, preferred embodiments of the present invention will be described in detail with reference to the annexed drawings.

Embodiment 1

A first embodiment of the present invention relates to a time authentication system in which, when a document creation unit creates an access log to each file therein, it can securely transmit the resulting log document to a document reception unit.

Figure 1:
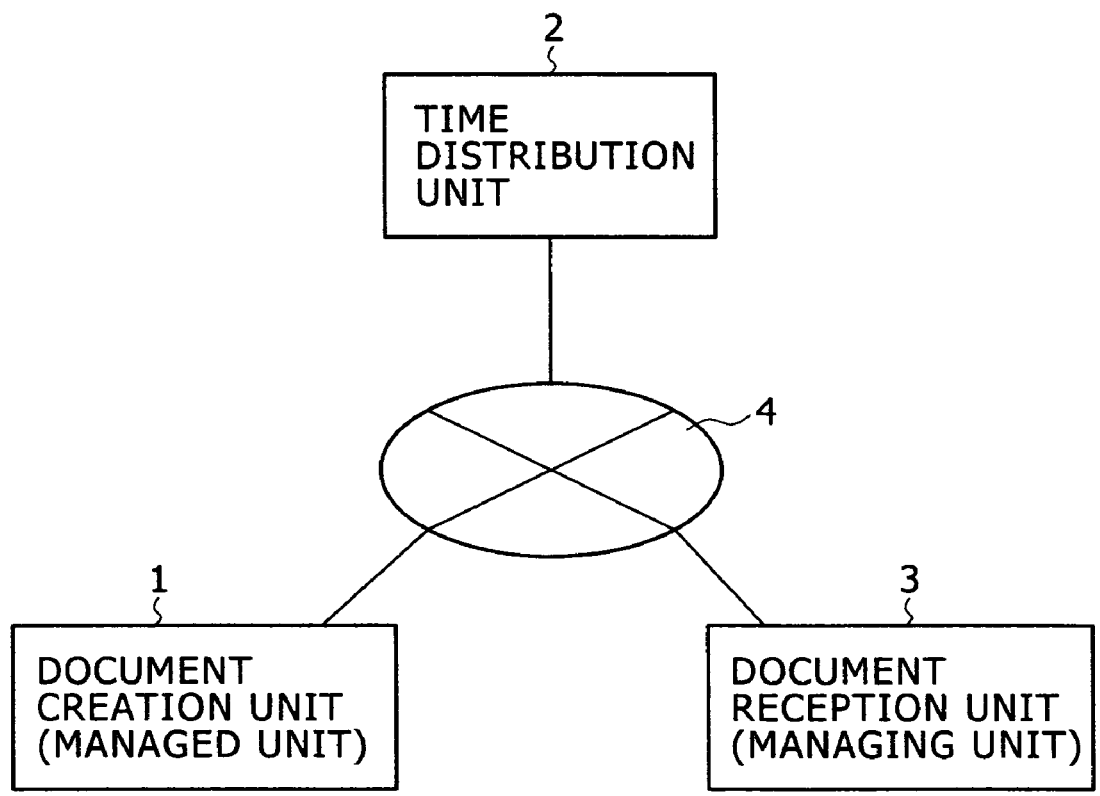
FIG. 1 is a block diagram showing the overall configuration of a system according to a first embodiment of the present invention.

FIG. 1 is a block diagram showing the overall configuration of the time authentication system. In this drawing, the reference numeral 1 denotes a document creation unit that creates a log document and transmits the log document to a document reception unit, 2 denotes a time distribution unit that distributes accurate time information, 3 denotes a document reception unit that receives the log document transmitted from the document creation unit 1 and verifies authenticity of time information in the log document, and 4 denotes the Internet. The document creation unit 1 accesses the time distribution unit 2 every 24 hours to receive a correct time from the time distribution unit 2 and set it as the latest time information.

FIG. 2 shows an example of the log document created by the document creation unit 1. In this drawing, the reference numeral 6 denotes the log document. The document creation unit 1 records a user name, a name of a file accessed by the user, and an access day and time in each row of the log document 6. Also, immediately after receiving a correct time from the time distribution unit 2, the document creation unit 1 additionally records the time in the log document 6. In FIG. 2, the reference numeral 7 denotes log information from 12:00:00 on Dec. 2, 2006 until 12:00:00 on Dec. 3, 2006. In the example shown in FIG. 2, the log information 7 includes the latest time information received from the time distribution unit 2.

FIG. 3 shows an example of a measurement log document created by the document creation unit 1, wherein the reference numeral 8 denotes the measurement log document. The document creation unit 1 records, in each row of the measurement log document 8, identification information (company name and product name) of each software running in the document creation unit 1, absolute path information of each module in the software, a hash value of the module, a number of a PCR in which the hash value is stored, and a number representing the order of the storage of the hash value in the PCR.

Identification information (company name and product name) of each software running therein, absolute path information of each module in the software, a hash value of the module, a number of a PCR in which the hash value is stored, and a number representing the order of the storage of the hash value in the PCR, recorded in each row of the measurement log document 8, constitute hash value identification information. For example, "PCR[16],1 company B, table calculation /usr/lib/Appl/module1.so" in FIG. 3 correspond to hash value identification information.

The PCR is an acronym of a Platform Configuration Register, which is one technical element of a Trusted Computing Group (TCG) and has an information keeping function. The function of the PCR in the present embodiment will be described later in detail. Also, immediately after receiving a correct time from the time distribution unit 2, the document creation unit 1 additionally records the time in the measurement log document 8. In FIG. 3, the reference numeral 9 denotes measurement log information from 12:00:00 on Dec. 2, 2006 until 12:00:00 on Dec. 3, 2006. In the example shown in FIG. 3, the measurement log information 9 includes the latest time information received from the time distribution unit 2.

FIG. 4 shows an example of a measurement auxiliary document created by the document creation unit 1, which is digital signature-embedded hash value information. In this drawing, the reference numeral 10 denotes the measurement auxiliary document. The document creation unit 1 records a number of each PCR and a hash value stored in the PCR of the same number in each row of the measurement auxiliary document 10. Also, immediately after receiving a correct time from the time distribution unit 2, the document creation unit 1 additionally records a digital signature value calculated by a method to be described later, and the time in the measurement auxiliary document 10. In the drawing, the reference numeral 11 denotes measurement auxiliary information from 12:00:00 on Dec. 2, 2006 until 12:00:00 on Dec. 3, 2006. Also, in the drawing, the reference numeral 12 denotes a digital signature value for combined information obtained by combining the log information 7 and the measurement auxiliary information 11. This digital signature value will be described later in detail.

FIG. 5 shows an example of a reference measurement document which is pre-stored in an auxiliary storage unit 208 of the document reception unit 3 in FIG. 10 to be described later in detail, and stored in a reference measurement document holder 215 of a main storage unit 211 as needed. In the drawing, the reference numeral 13 denotes the reference measurement document. This reference measurement document 13 is made up of a name of an application, a version of the application, a release day, a name of a selling company, a full path name of each module included in the application, a hash value of the module, and a digital signature by the selling company.

Figure 10:
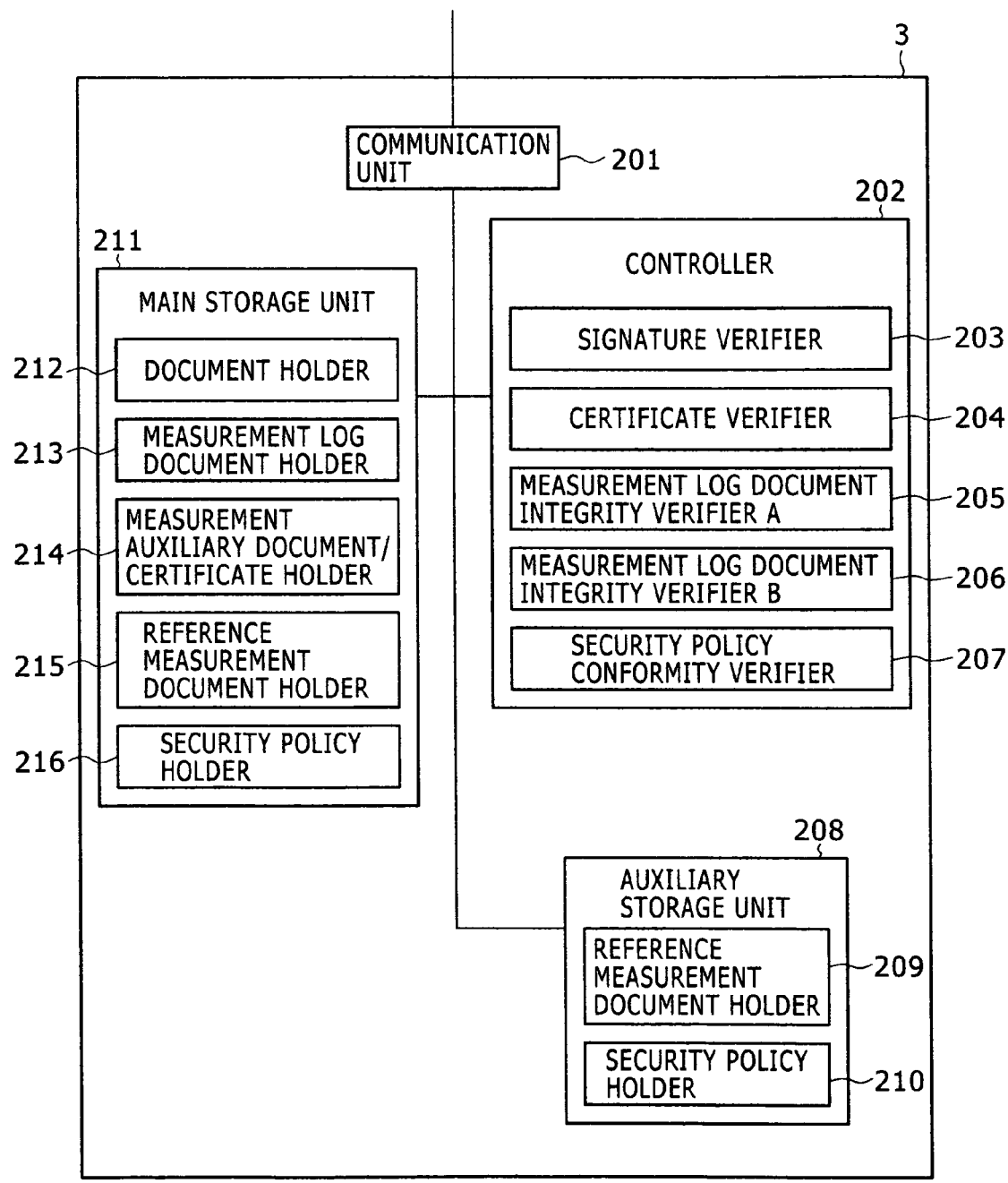
FIG. 10 is a block diagram showing an arrangement of modules in the document reception unit 3 of the first embodiment.

FIG. 6 shows an example of a security policy which is similarly pre-stored in the auxiliary storage unit 208 of the document reception unit 3 in FIG. 10, and stored in a security policy holder 216 of the main storage unit 211 as needed. In the drawing, the reference numeral 14 denotes the security policy. This security policy 14 is a document in which are recorded a list of identifiers of software to be run by the document creation unit 1, and a list of identifiers of software not to be run by the document creation unit 1.

Figure 7:
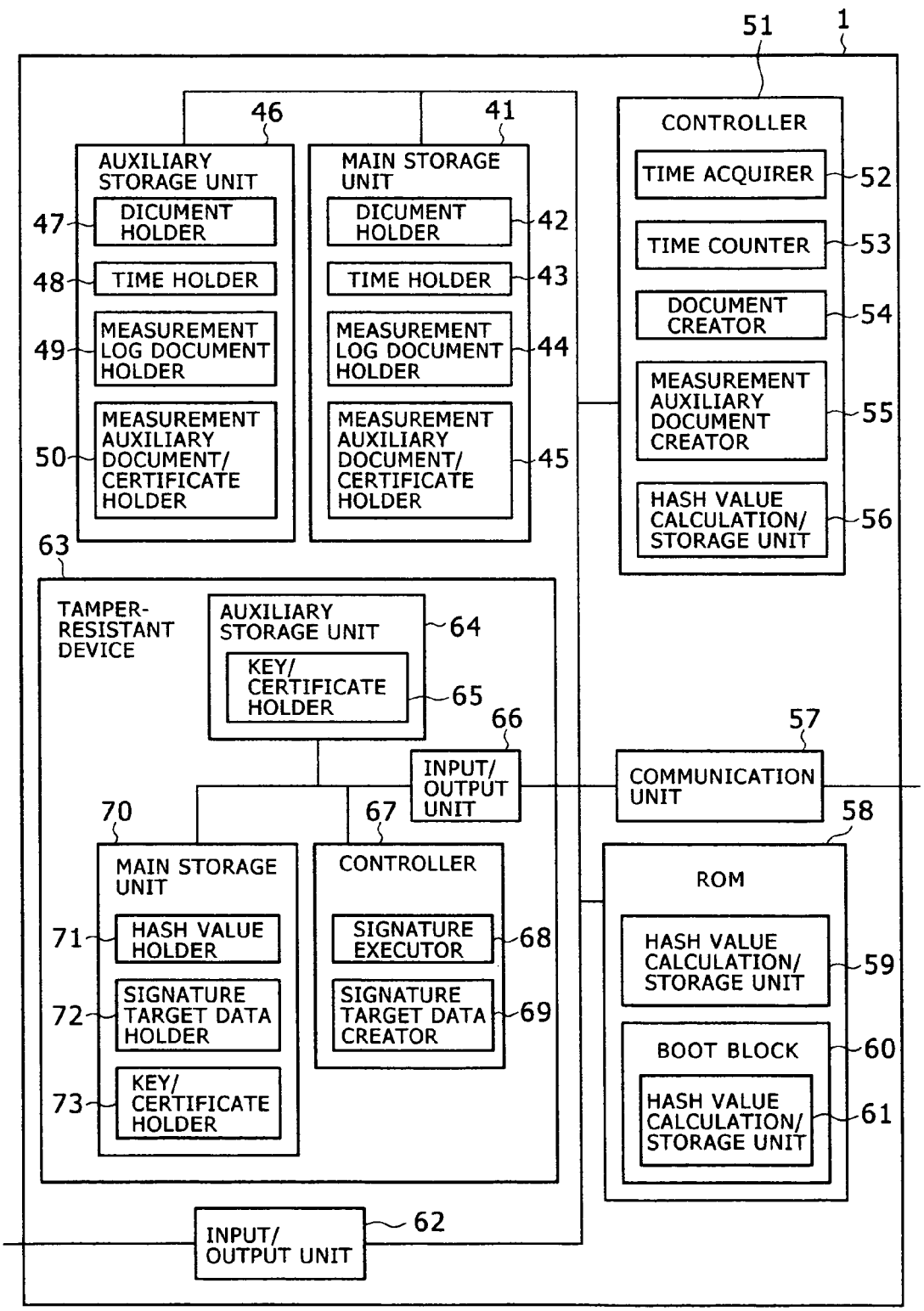
FIG. 7 is a block diagram showing an arrangement of modules in the document creation unit 1 of the first embodiment.

FIG. 7 shows one embodiment of the configuration of the document creation unit 1 and an arrangement of modules stored in the document creation unit 1. In this drawing, the reference numeral 41 denotes a main storage unit such as a dynamic random access memory (DRAM), 42 denotes a document holder that stores the log document 6, 43 denotes a time holder that stores time information acquired by a time acquirer 52 from the time distribution unit 2, 44 denotes a measurement log document holder that stores the measurement log document 8, and 45 denotes a measurement auxiliary document/certificate holder that stores the measurement auxiliary document 10 and a public key certificate corresponding to a signature key.

The reference numeral 46 denotes an auxiliary storage unit such as a hard disk drive (HDD), 47 denotes a document holder that stores the log document 6, 48 denotes a time holder that stores the time information acquired by the time acquirer 52 from the time distribution unit 2, 49 denotes a measurement log document holder that stores the measurement log document 8, and 50 denotes a measurement auxiliary document/certificate holder that stores the measurement auxiliary document 10 and the public key certificate corresponding to the signature key.

The reference numeral 51 denotes a controller such as a central processing unit (CPU), 52 denotes a time acquirer that accesses the time distribution unit 2 and acquires the time information therefrom, 53 denotes a time counter that extracts the time information stored in the time holder 43 and increments a time corresponding to the time information by one second, 54 denotes a document creator that creates the log document 6 and the measurement log document 8, and 55 denotes a measurement auxiliary document creator that accesses a signature executor 68 in a tamper-resistant device 63 and acquires, therefrom, information for creation of the measurement auxiliary document 10. The reference numeral 56 denotes a hash value calculation/storage unit that calculates a hash value of a given code and stores the hash value in the measurement log document holder 44 and a hash value holder 71. Notably, the hash value held in the hash value holder 71 becomes non-reversibly compressed information due to updating thereof, as will be described later in detail using an equation. As a result, the hash value held in the hash value holder 71 becomes different from the original hash value held in the measurement log document holder 44. Each of these functions of the controller 51 is composed of a program that is executed by a CPU, and so forth.

The reference numeral 57 denotes a communication unit such as a network interface card, and 58 denotes a read only memory (ROM) such as a basic input/output system (BIOS). The ROM 58 has plural functions: a hash value calculation/storage unit 59 for calculating a hash value of a given code and storing the hash value in the measurement log document holder 44 and hash value holder 71; a boot block 60 that is run first of all when the document creation unit 1 is started; and a hash value calculation/storage unit 61 for calculating a hash value of a given code and storing the hash value in the measurement log document holder 44 and hash value holder 71. Also, the reference numeral 62 denotes an input/output unit such as a keyboard, mouse or display. On the other hand, because the function of the hash value calculation/storage unit 56 is executed in the controller 51 and the functions of the hash value calculation/storage units 59 and 61 are executed in the ROM 58, the controller 51 and the ROM 58 may be collectively referred to as a processor.

The reference numeral 63 denotes a tamper-resistant device, such as a TPM, which has a defense function against a physical attack and enables preventing an internal private key from being leaked. In the tamper-resistant device 63, the reference numeral 64 denotes an auxiliary storage unit such as a nonvolatile memory. In this auxiliary storage unit 64, the reference numeral 65 denotes a key/certificate holder that stores a key or public key certificate. The reference numeral 66 denotes an input/output unit that analyzes the type of an execution statement sent from the controller 51, and 67 denotes a controller, such as a CPU, provided in the tamper-resistant device 63.

In the controller 67, the reference numeral 68 denotes a signature executor that executes a signature with respect to data in a signature target data holder 72 using a key and public key certificate in a key/certificate holder 73, and 69 denotes a signature target data creator that creates signature target data to be stored in the signature target data holder 72. Each of the signature executor 68 and signature target data creator 69 is composed of a program that is executed by the controller 67, and so forth.

Also, the reference numeral 70 denotes a main storage unit such as a volatile memory, 71 denotes a hash value holder that stores a hash value, 72 denotes a signature target data holder that stores signature target data created by the signature target data creator 69, and 73 denotes a key/certificate holder that holds a key and public key certificate extracted from the key/certificate holder 65.

Figure 8:
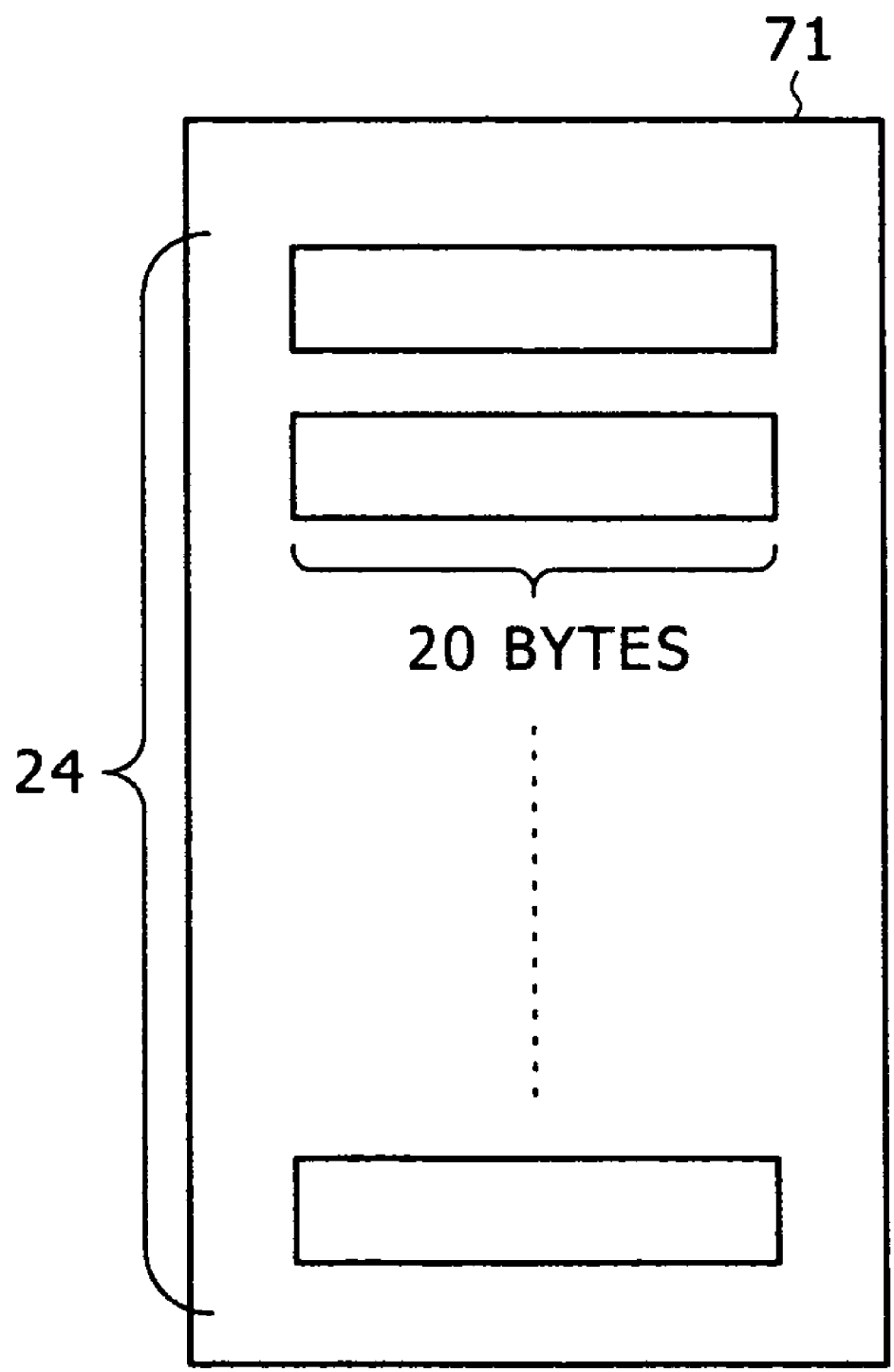
FIG. 8 is a detailed diagram of the structure of a hash value holder 71 of the first embodiment.

FIG. 8 shows a concrete example of the configuration of the hash value holder 71. The hash value holder 71 includes 24 20-byte storage areas. Because the size of 20 bytes is the same as that of a hash value calculated using an SHA-1 function, 24 results of the SHA-1 function can be stored in respective PCRs of the hash value holder 71. These 24 hash values are labeled PCR[0], PCR[1], PCR[2], ..., PCR[23], respectively. All the 24 PCR values are reset to 0 at the same time that the document creation unit 1 is restarted. After the document creation unit 1 is started, the hash value calculation/storage unit 56, hash value calculation/storage unit 59 and hash value calculation/storage unit 61 update the old PCR values of the hash value holder 71 to new ones based on the following equation.

$$\text{Value of } PCR[i] \text{ after update} = SHA\text{-}1 \text{ (value to be added|value of } PCR[i] \text{ before update) } (i=0, 1, \ldots, 23) \quad (A)$$

where SHA-1 (X) means that the hash function of SHA-1 is executed with respect to a factor X.

As will be described later in detail, the measurement auxiliary information 11 is created based on each PCR value in the hash value holder 71, and the signature target data creator 69 combines this measurement auxiliary information 11 with the log information 7 and stores the combined information as signature target data in the signature target data holder 72.

Figure 9:
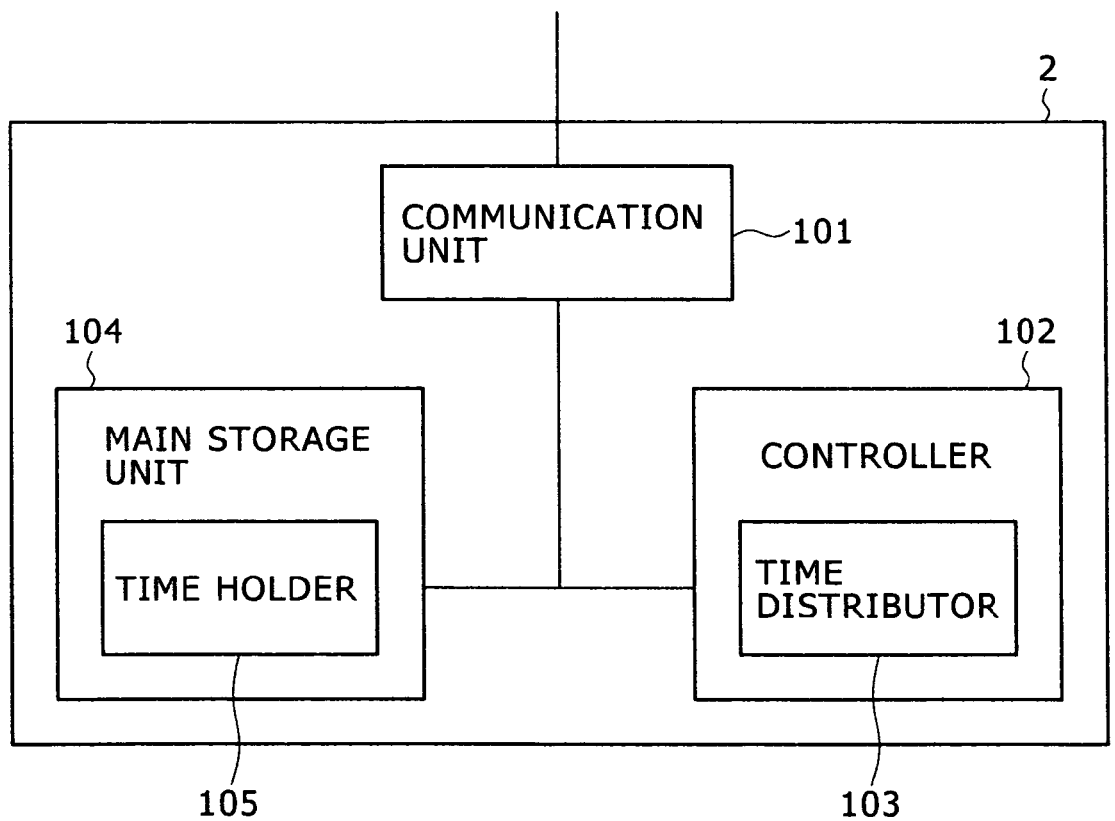
FIG. 9 is a block diagram showing an arrangement of modules in a time distribution unit 2 of the first embodiment.

FIG. 9 shows one example of the configuration of the time distribution unit 2 and an arrangement of modules stored in the time distribution unit 2. In this drawing, the reference numeral 101 denotes a communication unit such as a network interface card, 102 denotes a controller such as a CPU, and 103 denotes a time distributor that distributes a time and may be composed of, for example, a program which is executed by the controller 102. The reference numeral 104 denotes a main storage unit such as a memory, and 105 denotes a time holder that stores a time.

FIG. 10 shows one embodiment of the configuration of the document reception unit 3 and an arrangement of modules stored in the document reception unit 3. In this drawing, the reference numeral 201 denotes a communication unit such as a network interface card, 202 denotes a controller such as a CPU, 203 denotes a signature verifier that verifies a signature granted to the measurement auxiliary document 10, 204 denotes a certificate verifier that verifies whether a public key certificate is reliable in the document reception unit 3, 205 denotes a measurement log document integrity verifier A that verifies integrity of the measurement log document 8, 206 denotes a measurement log document integrity verifier B that compares hash values recorded in the measurement log document 8 and reference measurement document 13 to determine whether the contents of the measurement log document 8 are correct, and 207 denotes a security policy conformity verifier that verifies whether software information collected from the measurement log document 8 is matched with that in the security policy 14. Each of these parts may be provided as, for example, a program that is executed by the controller 202.

The reference numeral 208 denotes an auxiliary storage unit such as an HDD, 209 denotes a reference measurement document holder that stores the reference measurement document 13, and 210 denotes a security policy holder that stores the security policy 14. Also, the reference numeral 211 denotes a main storage unit such as a memory, 212 denotes a document holder that stores the log document 6, 213 denotes a measurement log document holder that stores the measurement log document 8, 214 denotes a measurement auxiliary document/certificate holder that stores the measurement auxiliary document 10 and a public key certificate corresponding to a signature key thereof, 215 denotes a reference measurement document holder that stores the reference measurement document 13, and 216 denotes a security policy holder that stores the security policy 14. Also, the document reception unit 3, in advance before communicating with the document creation unit 1, acquires the reference measurement document 13 from Web sites of plural software vendors and stores the reference measurement document 13 in the reference measurement document holder 209.

Although the reference numeral 4 in FIG. 1 has been described in the present embodiment to denote the Internet, it may denote the Intranet when the system is provided within one organization. Also, for the convenience of description, these two may be referred to as communication lines or networks.

Although the document creation unit 1 has been described in the present embodiment to access the time distribution unit 2 every 24 hours, the frequency of access may be changed by a setting of the user or manager of the document creation unit 1 and is not necessarily limited to one access per 24 hours.

Although the log document 6 has been taken as an example of a log document in the present embodiment, the format of a log document is not limited to the format of the log document 6 as long as the log document includes all time information about times at which the document creation unit 1 accesses the time distribution unit 2, and satisfies such a condition.

Although an access log to a file in the document creation unit 1 has been taken as an example of a log document in the present embodiment, the present invention is not necessarily limited thereto.

Although a log document has been taken as an example of a document created by the document creation unit 1 in the present embodiment, a contract document or the like may be taken as long as it is a document in which time information is recorded once or more. Also, documents in which time information is recorded once or more, including a log document, may be referred to as electronic documents.

Although the measurement log document 8 has been taken as an example of a measurement log document in the present embodiment, the format of a measurement log document is not limited to the format of the measurement log document 8 as long as the measurement log document is a document in which the same contents as those of the measurement log document 8 are recorded.

Although the measurement auxiliary document 10 has been taken as an example of a measurement auxiliary document in the present embodiment, the format of a measurement auxiliary document is not limited to the format of the measurement auxiliary document 10 as long as the measurement auxiliary document is a document in which the same contents as those of the measurement auxiliary document 10 are recorded.

Although the reference measurement document 13 has been taken as an example of a reference measurement document in the present embodiment, the format of a reference measurement document is not limited to the format of the reference measurement document 13 as long as the reference measurement document is a document in which the same contents as those of the reference measurement document 13 are recorded.

Although the ROM 58 has been described in the present embodiment to be included in the document creation unit 1, it is not limited in number as long as it is one or more in number.

Although the 24 PCRs have been described in the present embodiment to be included in the hash value holder 71, the PCRs are not limited in number as long as they satisfy the condition that the document reception unit 3 can verify integrity of the measurement log document 8 using the measurement auxiliary document 10.

Although the 24 PCR values have been described in the present embodiment to be reset to 0 at the same time that the document creation unit 1 is restarted, they may be reset to a different value. Also, the PCR values may be reset to different values by PCR numbers.

Although the hash value calculation/storage unit 56, hash value calculation/storage unit 59 and hash value calculation/storage unit 61 have been described in the present embodiment to use SHA-1 as the hash function, they may use other hash functions. However, in this case, the size of a memory per one PCR in the hash value holder 71 must be equal to that of a value of a hash function used, not 20 bytes.

Although the tamper-resistant device 63 has been assumed in the present embodiment to be TPM version 1.2, it is not necessarily limited to the TPM as long as it has the same function as that of the tamper-resistant device 63.

Although the source of acquisition of the reference measurement document 13 by the document reception unit 3 has been specified as Web sites of plural software vendors in the present embodiment, the method for acquisition of the reference measurement document 13 is not limited thereto. For example, in the case where the document creation unit 1 and the document reception unit 3 are present in the same Intranet environment, an Intranet manager may realize the above by creating the document creation unit 1 under the clean condition that any software is not tampered at all, acquiring desired hash value data from the document creation unit, creating the reference measurement document 13 based on the hash value data, and storing the reference measurement document 13 in the reference measurement document holder 209.

Next, the entire operation of the time authentication system according to the first embodiment will be described.

First, as the document creation unit 1 is started, the hash value calculation/storage unit 56, hash value calculation/storage unit 59 and hash value calculation/storage unit 61 calculate hash values of all execution codes existing in the ROM 58 and auxiliary storage unit 46 by means of a method to be described later, store hash value identifiers, which are information for identification of all the hash values, and the hash values in the measurement log document holder 44, and store all the hash values in the hash value holder 71. The document creator 54 creates the log document 6 and stores it in the document holder 42.

When the time acquirer 52 is coupled to the time distribution unit 2 through the communication unit 57 to acquire correct time information, the measurement auxiliary document creator 55 inputs the log information 7 to the tamper-resistant device 63 and creates measurement auxiliary information and a digital signature value, such as the measurement auxiliary information 11 and digital signature value 12 shown in FIG. 4, in the tamper-resistant device 63. Thereafter, the measurement auxiliary document creator 55 receives the created measurement auxiliary information and digital signature value and a public key certificate from the tamper-resistant device 63, and additionally records the received measurement auxiliary information and digital signature value and the time information in the measurement auxiliary document 10 in the measurement auxiliary document/certificate holder 45 and additionally stores the received public key certificate in the measurement auxiliary document/certificate holder 45.

Also, the document creation unit 1 transmits the log document 6, measurement log document 8, measurement auxiliary document 10 and public key certificate to the document reception unit 3 through the communication unit 57. The document reception unit 3 of FIG. 10 receives the log document 6, measurement log document 8, measurement auxiliary document 10 and public key certificate through the communication unit 201 and stores the received documents and certificate in the document holder 212, measurement log document holder 213 and measurement auxiliary document/certificate holder 214, respectively.

Figure 11:
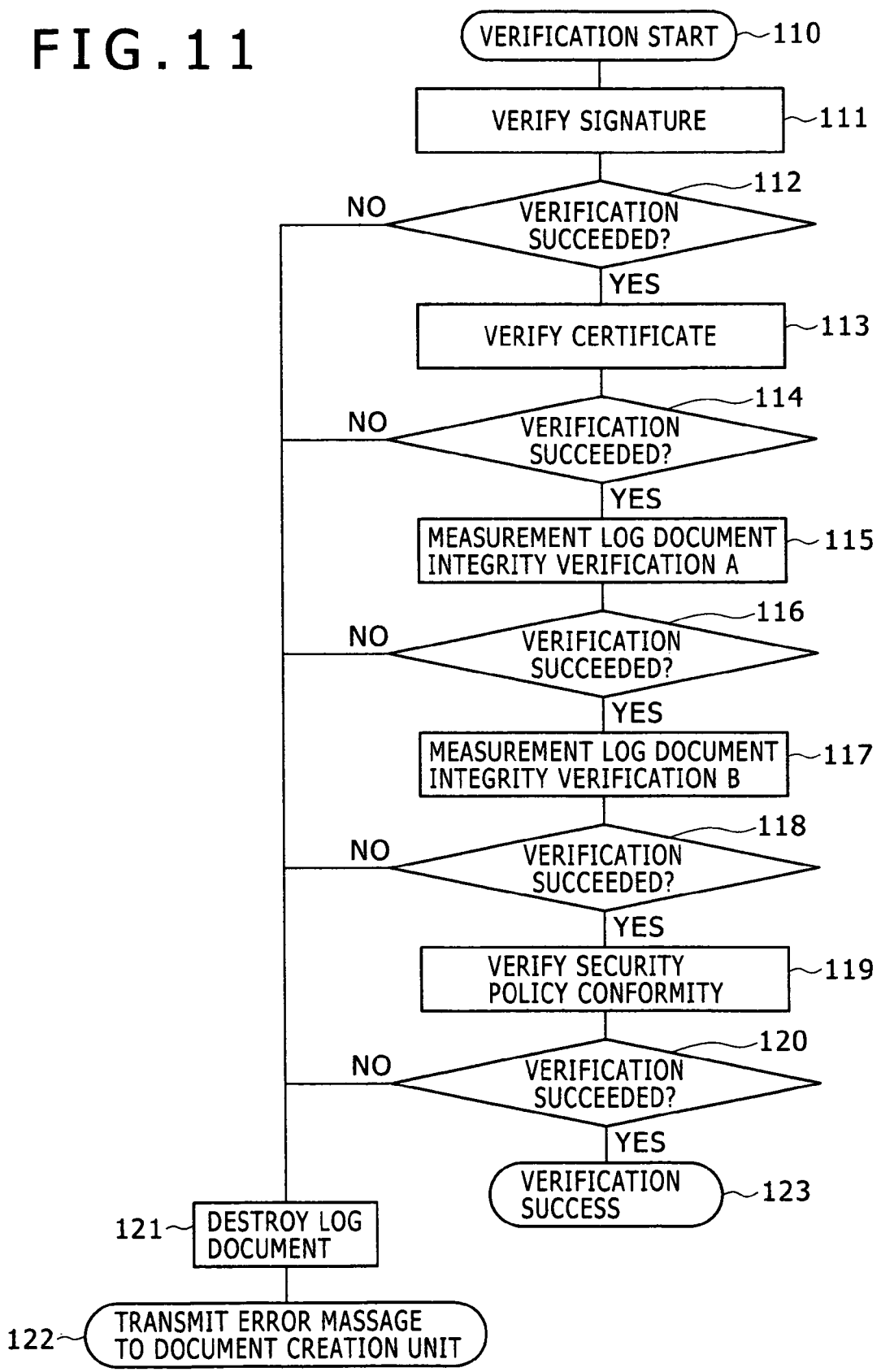
FIG. 11 is a flowchart illustrating the integrity verification and security policy conformity verification for the measurement log document and measurement auxiliary document by the document reception unit 3 of the first embodiment.

Then, as shown in FIG. 11, the signature verifier 203 of the controller 202 in the document reception unit 3 performs signature verification with respect to the measurement auxiliary document 10 in the measurement auxiliary document/certificate holder 214 (Step 111), the certificate verifier 204 performs certificate verification with respect to the public key certificate in the measurement auxiliary document/certificate holder 214 (Step 113), and the measurement log document integrity verifier A 205 performs integrity verification A with respect to the measurement log document 8 in the measurement log document holder 213 using the measurement auxiliary document 10 in the measurement auxiliary document/certificate holder 214 by means of a method to be described later (Step 115).

Subsequently, the measurement log document integrity verifier B 206 performs integrity verification B with respect to all reference measurement documents in the reference measurement document holder 215 by searching plural reference measurement documents stored in the reference measurement document holder 209 for one having the same software identifier (company name and product name) as that recorded in the measurement log document 8 in the measurement log document holder 213, loading a reference measurement document corresponding to the search result into the reference measurement document holder 215 and determining whether a list of modules and hash values thereof recorded in the measurement log document 8 are the same as information recorded in the loaded reference measurement document (Step 117).

Also, the security policy conformity verifier 207 performs security policy conformity verification by loading the security policy 14 existing in the security policy holder 210 into the security policy holder 216 and determining whether all software information recorded in the measurement log document 8 is matched with that in the security policy 14 (Step 119). That is, the security policy conformity verifier 207 determines whether the measurement log document 8 includes all information about software to be included, in the security policy 14, and the measurement log document 8 never includes information about software not to be included, in the security policy 14.

Also, as shown in FIG. 11, when at least one of the above-stated verification processes fails in verification (No at at least one of steps 112, 114, 116, 118 and 120), the document reception unit 3 recognizes that the log document 6 and the time information recorded therein are not reliable, and then destroys the log document 6 (Step 121) and transmits, to the document creation unit 1, a message in which is recorded the reason why the log document 6 is not accepted (Step 122). In the case where all the aforementioned verification processes succeed in verification (Yes at all steps 112, 114, 116, 118 and 120), the document reception unit 3 succeeds in verification (Step 123).

Also, a certificate authority (although this certificate authority is not shown, it is generally coupled to the Internet 4 in FIG. 4), which issues the public key certificate in the key/certificate holder 65, must issue the public key certificate after confirming three conditions: that a key pair is created within the tamper-resistant device 63; that a private key cannot be extracted from the tamper-resistant device 63; and that the tamper-resistant device 63 operates as expected in all processes with which the PCR is associated. Further, the certificate verifier 204 in the document reception unit 3 must have a method for determining whether a received public key certificate has been issued from a certificate authority satisfying the above conditions.

Through a series of processes described above, the creation of a log document, measurement log document and measurement auxiliary document by the document creation unit 1, the transmission of this document group and a public key certificate from the document creation unit 1 to the document reception unit 3, and the integrity verification and security policy conformity verification for the document group and public key certificate by the document reception unit 3 are completed. Therefore, because the possibility that the time information recorded in the log document 6 was tampered is sufficiently low, the document reception unit 3 can confirm reliability of the log document 6.

Although the document reception unit 3 has been described in the present embodiment to verify the integrities of the measurement log document 8 and measurement auxiliary document 10, it may not necessarily perform the above-stated verification processes. For example, the document reception unit 3 may entrust some or all of the above-stated verification processes to a different unit on the Internet or Intranet, trusted thereby.

Although the security policy 14 shown in FIG. 6 has been taken as an example of a security policy in the present embodiment, the manager of the document reception unit 3 may set any security policy.

Next, with reference to FIG. 12, a detailed description will be given of, in the entire operation of the system, the operations of the hash value calculation/storage unit 56, hash value calculation/storage unit 59 and hash value calculation/storage unit 61 calculating hash values of all execution codes existing in the ROM 58 and auxiliary storage unit 46, storing all the hash values and identifiers thereof in the measurement log document holder 44, and storing all hash values updated by the above equation A in the hash value holder 71. Also, because the function of the hash value calculation/storage unit 56 is executed in the controller 51 and the functions of the hash value calculation/storage units 59 and 61 are executed in the ROM 58, the controller 51 and the ROM 58 may be collectively referred to as a processor, as stated above.

When the user of the document creation unit 1 powers on the document creation unit 1, the boot block 60 in the ROM 58 is run first of all. The boot block 60 calculates a hash value of an execution code thereof using the hash value calculation/storage unit 61, records an identifier of the execution code and the hash value in the measurement log document 8 in the measurement log document holder 44, and stores the hash value in the PCR[0] of the hash value holder 71. In the case where the execution code is divided into plural files, the value of the PCR[0] in the hash value holder 71 is updated according to the above equation A.

Then, the hash value calculation/storage unit 61 calculates a hash value of an execution code other than that of the boot block 60, existing in the ROM 58, records an identifier of the execution code and the hash value in the measurement log document 8 in the measurement log document holder 44, and stores the hash value in the PCR[1] of the hash value holder 71. In the case where the execution code is divided into plural files, the value of the PCR[1] is updated according to the above equation A.

Then, the boot block 60 executes this execution code.

Thereafter, the hash value calculation/storage unit 59 calculates a hash value of an execution code of a file corresponding to an operating system (OS) loader, among respective files of OS and application software stored in the auxiliary storage unit 46, records an identifier of the execution code and the hash value in the measurement log document 8 in the measurement log document holder 44, and stores the hash value in the PCR[2] of the hash value holder 71. In the case where the execution code is divided into plural files, the value of the PCR[2] is updated according to the above equation A.

Then, the ROM 58 executes this execution code.

Thereafter, the OS loader calculates a hash value of an execution code of a file corresponding to an OS kernel, among the respective files of the OS and application software stored in the auxiliary storage unit 46, records an identifier of the execution code and the hash value in the measurement log document 8 in the measurement log document holder 44, and stores the hash value in the PCR[3] of the hash value holder 71. In the case where the execution code is divided into plural files, the value of the PCR[3] is updated according to the above equation A.

Then, the OS loader executes the execution code of the OS kernel.

Thereafter, the OS kernel calculates a hash value of an execution code of a file corresponding to software called Platform Trust Services (PTS), among the respective files of the OS and application software stored in the auxiliary storage unit 46, records an identifier of the execution code and the hash value in the measurement log document 8 in the measurement log document holder 44, and stores the hash value in the PCR[4]. In the case where the execution code is divided into plural files, the value of the PCR[4] is updated according to the above equation A. The PTS is software that monitors running of all application software existing in an upper software stack of the OS kernel.

Then, the OS kernel executes the execution code of the PTS.

Thereafter, the PTS monitors a system call calling application software, and, whenever the system call is generated, calculates a hash value of an execution code of corresponding application software, records an identifier of the execution code and the hash value in the measurement log document 8 in the measurement log document holder 44, and stores the hash value in the PCR[5]. In the case where the execution code is divided into plural files, the value of the PCR[5] is updated according to the above equation A. Also, because plural application software is generally present in the document creation unit 1, the value of the PCR[5] is updated according to the above equation A even in the case where a hash value of an execution code of application software run subsequently to the first application software is calculated.

Through a series of processes described above, the operations of the hash value calculation/storage unit 56, hash value calculation/storage unit 59 and hash value calculation/storage unit 61 calculating hash values of all execution codes existing in the ROM 58 and auxiliary storage unit 46, storing all the hash values and identifiers thereof in the measurement log document holder 44, and storing all the hash values in the hash value holder 71 are completed.

On the other hand, unintended software, such as virus or spyware, invaded the document creation unit 1 may easily tamper the measurement log document 8 in the measurement log document holder 44 after application software is run. However, because the PCR value in the hash value holder 71 is always calculated based on the above-stated equation A, the virus or spyware cannot change the PCR value to an intended specific value even though it may change the PCR value to an unspecific value.

Figure 12:
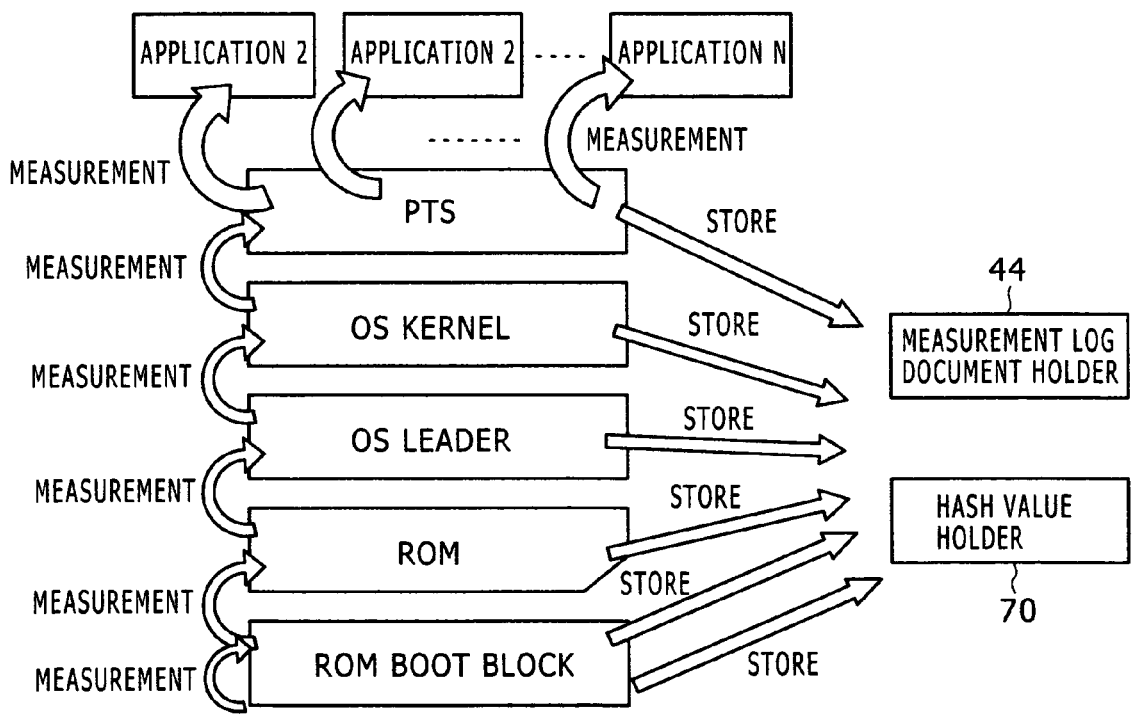
FIG. 12 is a view illustrating hash value calculation/storage when the document creation unit 1 of the first embodiment is started.

Although the running order of plural software modules in the document creation unit 1 has been specified in FIG. 12 in the present embodiment, it will be understood that each software module does not need to be run in the order of FIG. 12.

Although software modules running in the document creation unit 1 have been specified as shown in FIG. 12 in the present embodiment, the number of software modules measured in running or the number of measurement steps from the ROM boot block to each application does not need to be equal to that in FIG. 12. For example, the ROM may measure the PTS or application directly in place of the OS loader.

Although the hash values of the boot block, ROM, OS loader, OS kernel, PTS and application have been stored respectively in the PCR[0], PCR[1], PCR[2], PCR[3], PCR[4] and PCR[5] in the present embodiment, the hash values may be stored in PCRs of different numbers, five or more PCRs may be used, and all the hash values may be stored in one PCR according to the above-stated equation A as long as the following condition is satisfied. That is, this condition is that the document reception unit 3 can reconstruct a hash value recorded in the measurement auxiliary document 10 from a hash value identifier, which is hash value identification information, and a hash value recorded in the received measurement log document 8 by means of a method to be described below.

Next, a detailed description will be given of, in the entire operation of the system, an operation when the document creation unit 1 creates the measurement auxiliary document 10.

First, the measurement auxiliary document creator 55 extracts log information 7 corresponding to a period from 12:00:00 on Dec. 2, 2006 to 12:00:00 on Dec. 3, 2006 from the log document 6 in the document holder 42 and transmits the extracted log information 7 to the signature target data creator 69. Then, the signature target data creator 69 creates measurement auxiliary information 11 based on the value of each PCR in the hash value holder 71, combines this measurement auxiliary information 11 with the log information 7 and stores the combined information as signature target data in the signature target data holder 72. Then, the signature executor 68 loads a signature key and public key certificate stored in the key/certificate holder 65 into the key/certificate holder 73. Subsequently, the signature executor 68 executes a digital signature with respect to the signature target data in the signature target data holder 72 using the above key, and creates a digital signature value 12. Finally, the signature executor 68 transmits the measurement auxiliary information 11, digital signature value 12 and public key certificate to the measurement auxiliary document creator 55.

Next, with reference to FIG. 13, a detailed description will be given of, in the entire operation of the system, an operation when the measurement log document integrity verifier A 205 in the document reception unit 3 performs integrity verification (integrity verification A) with respect to the measurement log document 8 in the measurement log document holder 213 using the measurement auxiliary document 10 in the measurement auxiliary document/certificate holder 214.

Figure 13:
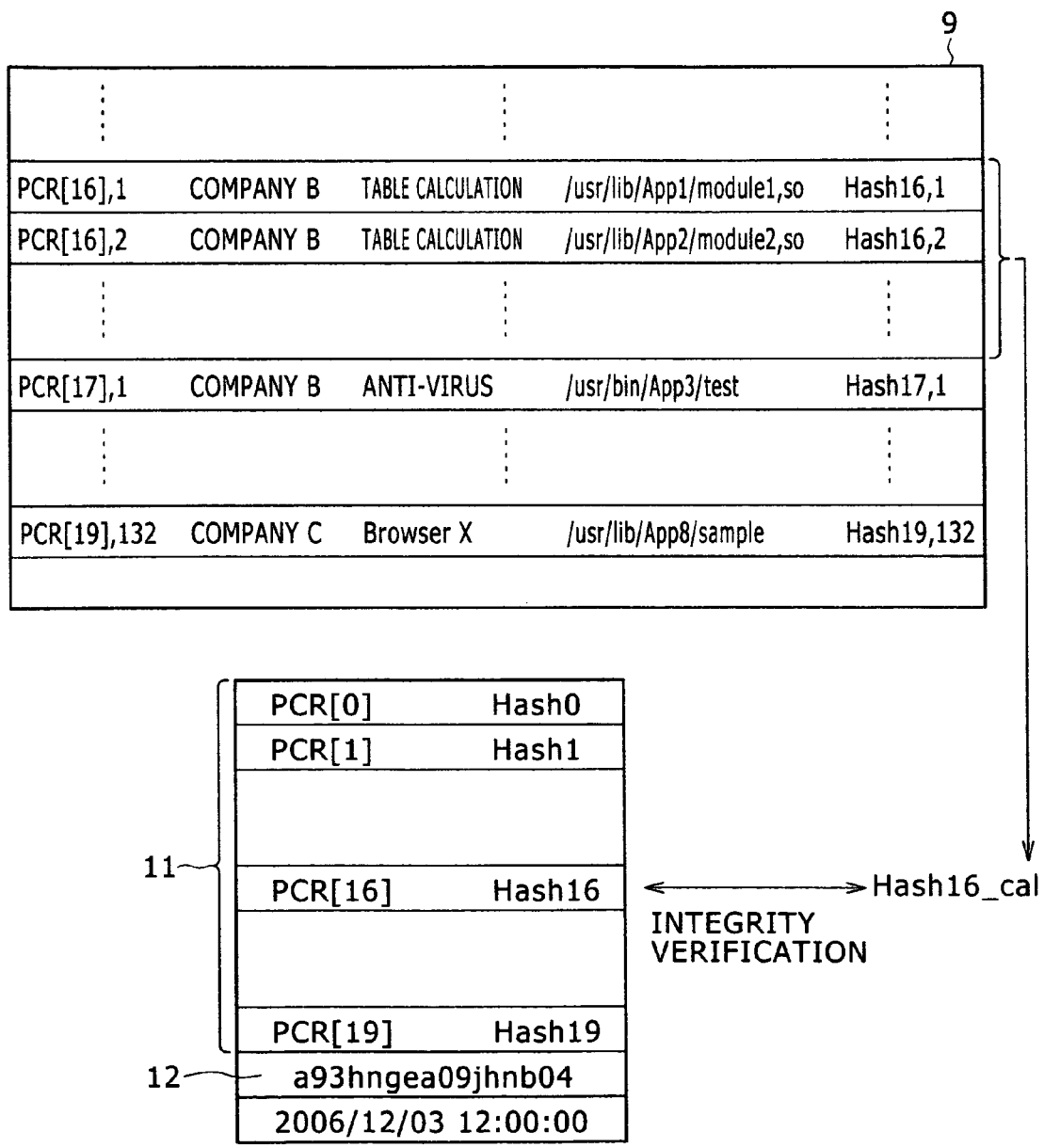
FIG. 13 is a view illustrating the integrity verification for the measurement log document by the document reception unit 3 of the first embodiment.

FIG. 13 illustrates, in the operation flow of the document reception unit 3 shown in FIG. 11, the process (Step 115) of the measurement log document integrity verifier A 205 verifying a matching between the above two documents with regard to the value of the PCR[16].

First, the measurement log document integrity verifier A 205 calculates Hash16_cal according to the following equation.

$$\text{Hash16\_cal} = SHA(\text{Hash16},N|SHA(\text{Hash16},N{-}1|\ldots SHA(\text{Hash16},3|SHA(\text{Hash16},2|\text{Hash16},1))\ldots)) \quad (B)$$

Then, the measurement log document integrity verifier A 205 compares the value of the PCR[16] recorded in the measurement auxiliary information 11 with the Hash16_cal to determine whether the two values are equal.

In a similar manner, the measurement log document integrity verifier A 205 performs the same calculation and comparison with respect to PCRs other than the PCR[16] to determine whether PCR values recorded in the measurement auxiliary information 11 are equal to values calculated from the measurement log information 9. When all the PCR values are equal to the corresponding values calculated from the measurement log information 9, the measurement log document integrity verifier A 205 determines the measurement log information 9 to be integral.

In a similar manner, the measurement log document integrity verifier A 205 performs the same calculation and comparison with respect to periods other than the period from 12:00:00 on Dec. 2, 2006 to 12:00:00 on Dec. 3, 2006, and determines the measurement log document 8 to be integral when all the PCR values are equal to the corresponding values calculated from the measurement log information 9.

Through a series of processes described above, the operation of the measurement log document integrity verifier A 205 in the document reception unit 3 performing integrity verification with respect to the measurement log document 8 using the measurement auxiliary document 10 is completed.

Embodiment 2

Hereinafter, a description will be given of a system according to a second embodiment of the present invention, in which, when a Web server module in a managed unit such as a document creation unit creates an access log to a file in the unit, the unit can securely transmit the resulting log document to a managing unit such as a document reception unit.

This system is the same in configuration as that in the embodiment 1. In the system, a managed unit, which is a document creation unit 1, transmits a log document to a managing unit, or document reception unit 3, which is a communication counterpart. In the drawing, the reference numeral 1 denotes a managed unit that creates a log document and transmits the log document to a managing unit. In the present embodiment, the document creation unit 1 in FIG. 1 will be referred to as the managed unit, and the document reception unit 2 in FIG. 1 will be referred to as the managing unit. The managing unit 3 receives the log document and hash value information of software held in the managed unit 1, transmitted from the managed unit 1, verifies that the software of the managed unit 1 operates correctly, and then accepts the log document. The managed unit 1, immediately before transmitting the log document to the managing unit 3, accesses a time distribution unit 2 over the Internet 4 to receive a correct time therefrom. The time distribution unit 2 has the configuration shown in FIG. 9 similarly to that in the first embodiment. The Internet 4 may be replaced by the Intranet within one organization.

The reference numeral 130 in FIG. 14 denotes a log document created by a Web server running in the managed unit 1. The managed unit 1 records a user name, a name of a file accessed by the user, and an access day and time in each row of the log document 130. Also, immediately after receiving a correct time from the time distribution unit 2, the managed unit 1 additionally records the time in the log document 130.

The reference numeral 131 in FIG. 15 denotes a measurement log document created by the managed unit 1. The managed unit 1 records, in each row of the measurement log document 131, identification information (company name and product name) of each software running in the managed unit 1, absolute path information of each module in the software, a hash value of the module, a number of a PCR in which the hash value is stored, and a number representing the order of the storage of the hash value in the PCR. The details of the PCR are the same as stated above. Also, in the present embodiment, the managed unit 1 keeps information about the PCR[0] to PCR[4] and PCR[16] as a measurement log.

Figure 16:
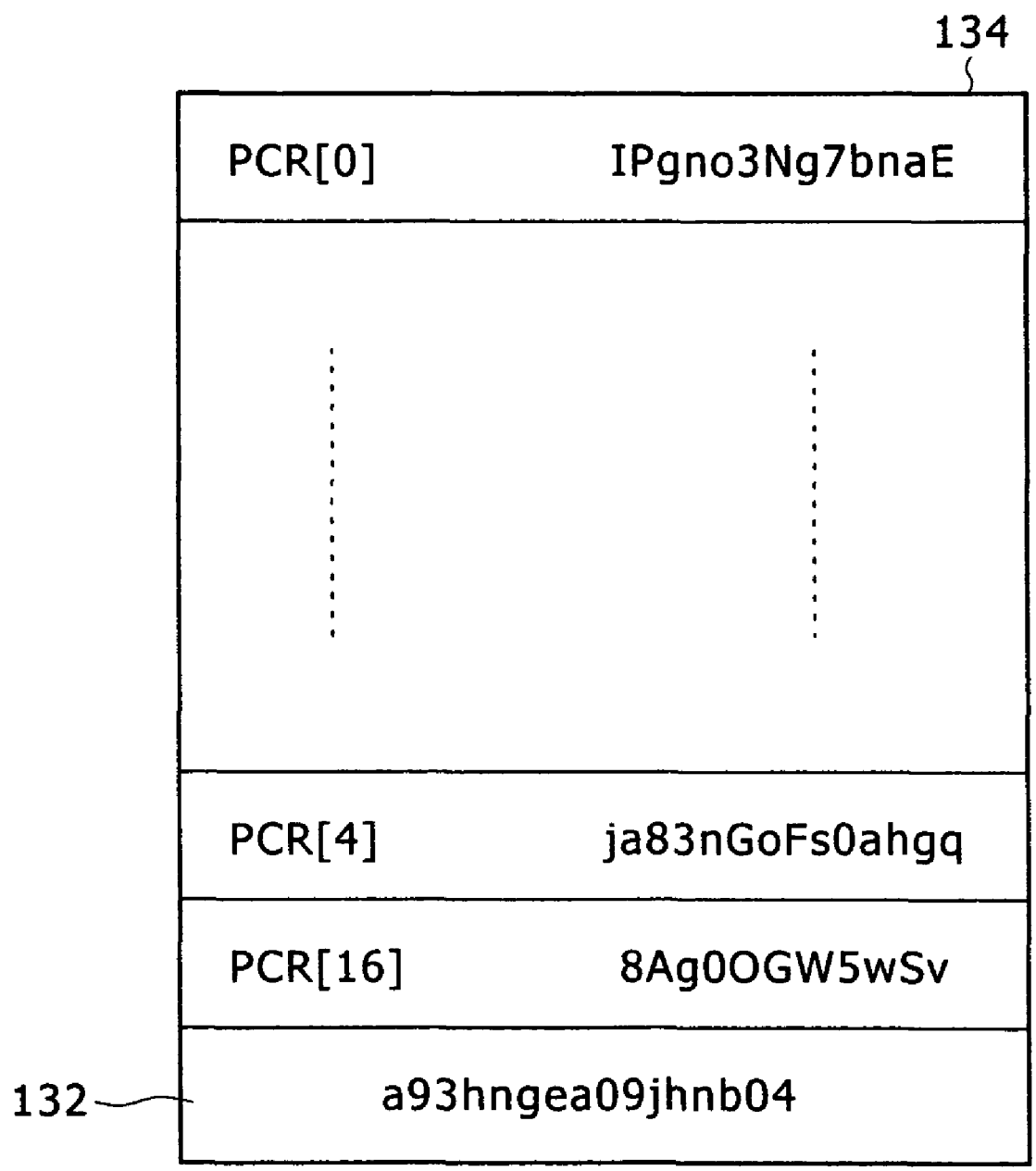
FIG. 16 is a view illustrating a measurement auxiliary document created by the managed unit 1 of the second embodiment.

The reference numeral 134 in FIG. 16 denotes a measurement auxiliary document created by the managed unit 1. The measurement auxiliary document 134 includes a number of each PCR, a hash value stored in the PCR of the same number, and a digital signature value calculated by a method to be described later.

Figure 17:
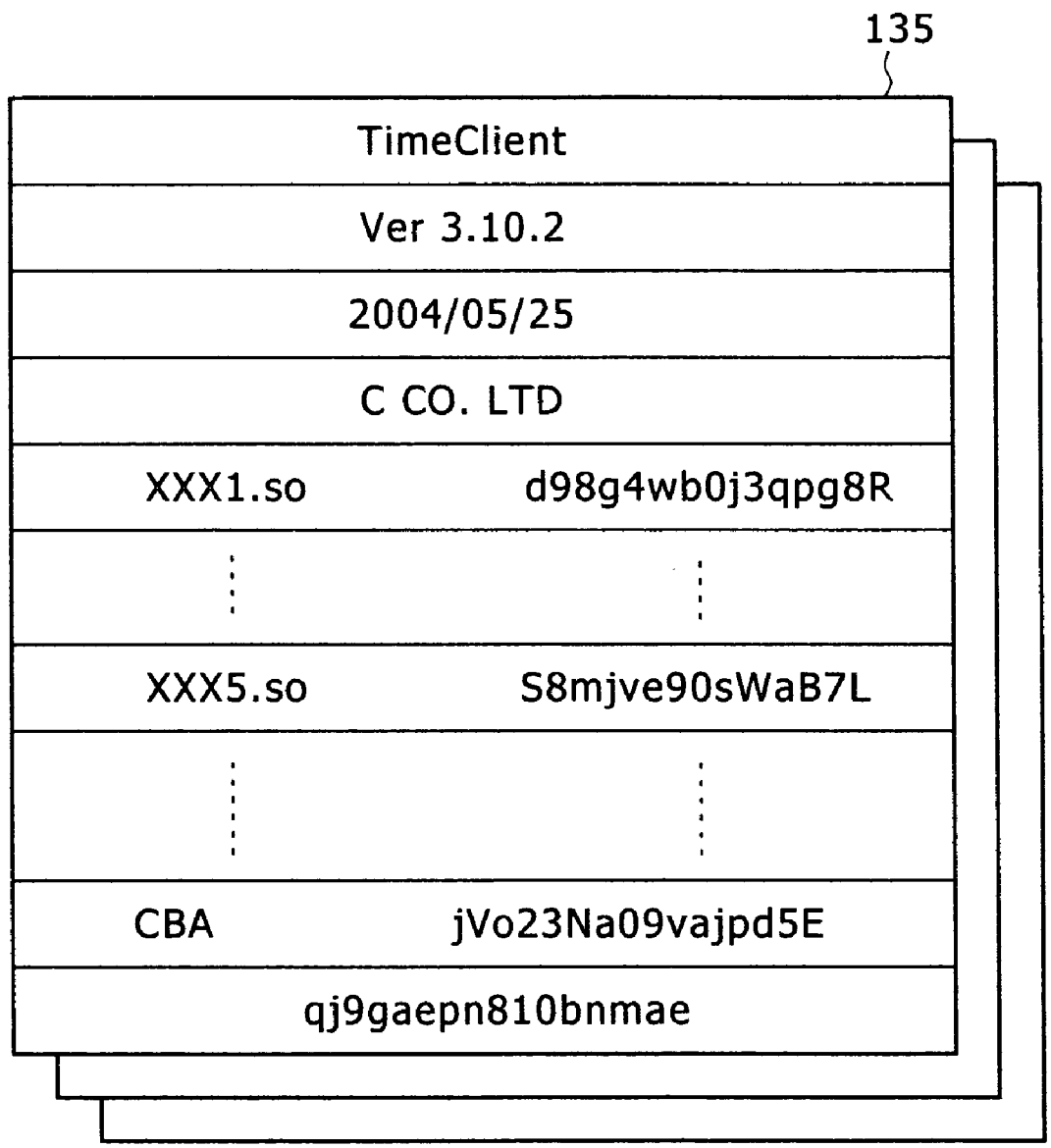
FIG. 17 is a view illustrating plural reference measurement documents stored in a managing unit 3 of the second embodiment, which is a document reception unit.

The reference numeral 135 in FIG. 17 denotes a reference measurement document which is stored in a storage unit of the managing unit 3. The reference measurement document 135 is made up of a name of an application, a version of the application, a release day, a name of a selling company, a full path name of each module included in the application, a hash value of the module, and a digital signature by the selling company.

Figure 18:
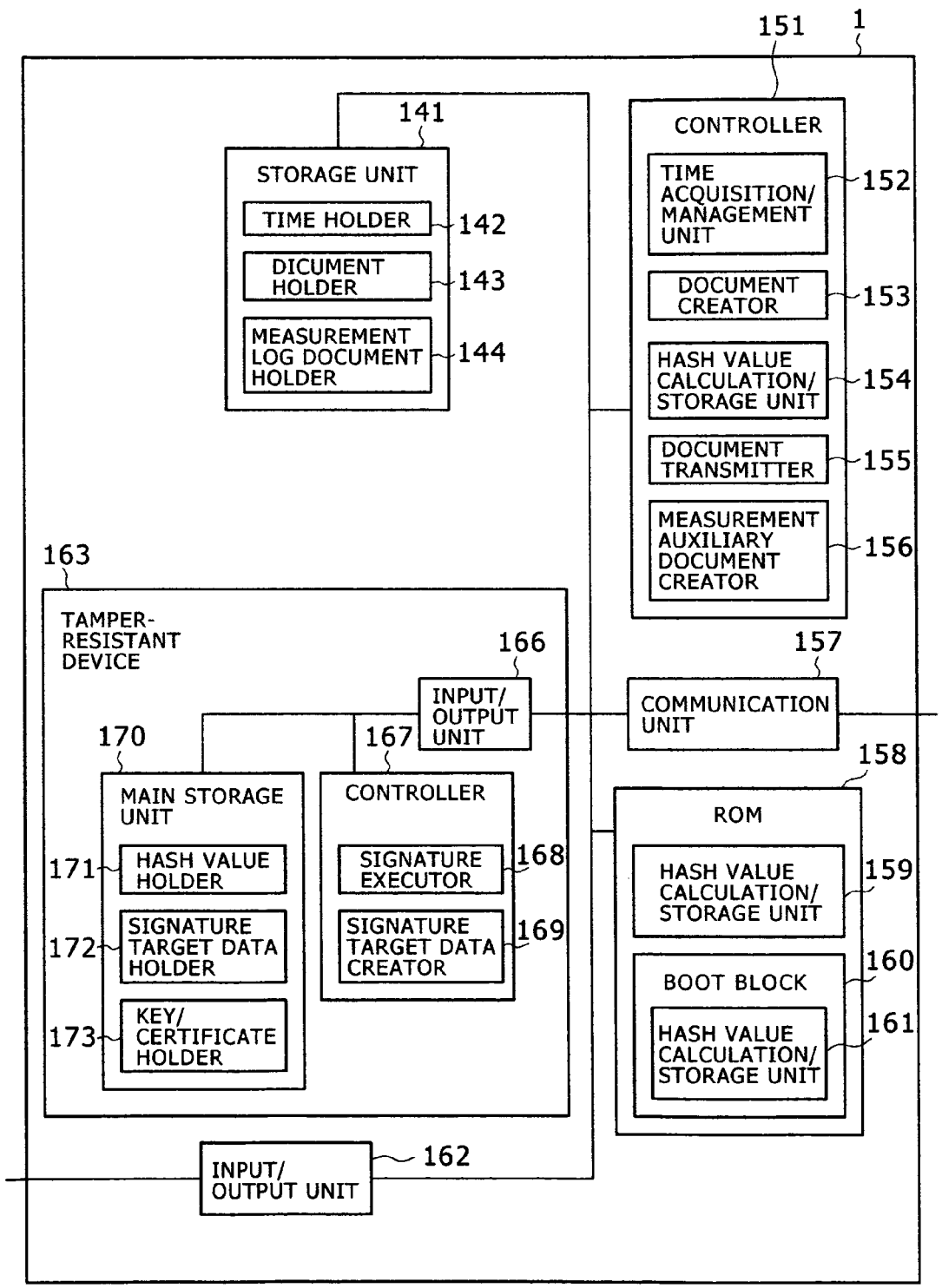
FIG. 18 is a block diagram showing an arrangement of modules in the managed unit 1 of the second embodiment.

FIG. 18 shows an arrangement of modules stored in the managed unit 1. In this drawing, the reference numeral 141 denotes a storage unit such as a DRAM or HDD, 142 denotes a time holder that stores time information acquired by a time acquirer 152 from the time distribution unit 2, 143 denotes a document holder that stores the log document 130, 144 denotes a measurement log document holder that stores the measurement log document 131, 151 denotes a controller such as a CPU, 152 denotes a time acquisition/management unit that accesses the time distribution unit 2 to acquire the time information therefrom and counts the time information, 153 denotes a document creator that is a module in the Web server and creates the log document 130, 154 denotes a hash value calculation/storage unit that calculates a hash value of a file and stores the hash value in the measurement log document holder 144 and a hash value holder 171, 155 denotes a document transmitter that creates needed documents according to a flowchart to be described later and transmits and receives information with the managing unit 3, 156 denotes a measurement auxiliary document creator that accesses a signature executor 168 and acquires the measurement auxiliary document 134 therefrom, 157 denotes a communication unit such as a network interface card, 158 denotes a ROM such as a BIOS, 159 denotes a hash value calculation/storage unit that calculates a hash value of a given code and stores the hash value in the measurement log document holder 144 and hash value holder 171, 160 denotes a boot block that is run first of all when the managed unit 1 is started, 161 denotes a hash value calculation/storage unit that calculates a hash value of a given code and stores the hash value in the measurement log document holder 144 and hash value holder 171, and 162 denotes an input/output unit such as a keyboard, mouse or display.

The reference numeral 163 denotes a tamper-resistant device, such as a TPM, which has a defense function against a physical attack and enables preventing an internal private key from being leaked, 166 denotes an input/output unit that analyzes the type of an execution statement sent from the controller 151, 167 denotes a controller provided in the tamper-resistant device 163, 168 denotes a signature executor that executes a signature with respect to data in a signature target data holder 172 using a key and public key certificate in a key/certificate holder 173, 169 denotes a signature target data creator that creates signature target data to be stored in the signature target data holder 172, 170 denotes a storage unit such as a volatile memory or nonvolatile memory, 171 denotes a hash value holder that stores a hash value, 172 denotes a signature target data holder that stores signature target data, and 173 denotes a key/certificate holder that holds a key and public key certificate.

The hash value holder 171 has the same configuration as that of the hash value holder 71 of the first embodiment shown in FIG. 8, and includes 24 20-byte storage areas.

Figure 19:
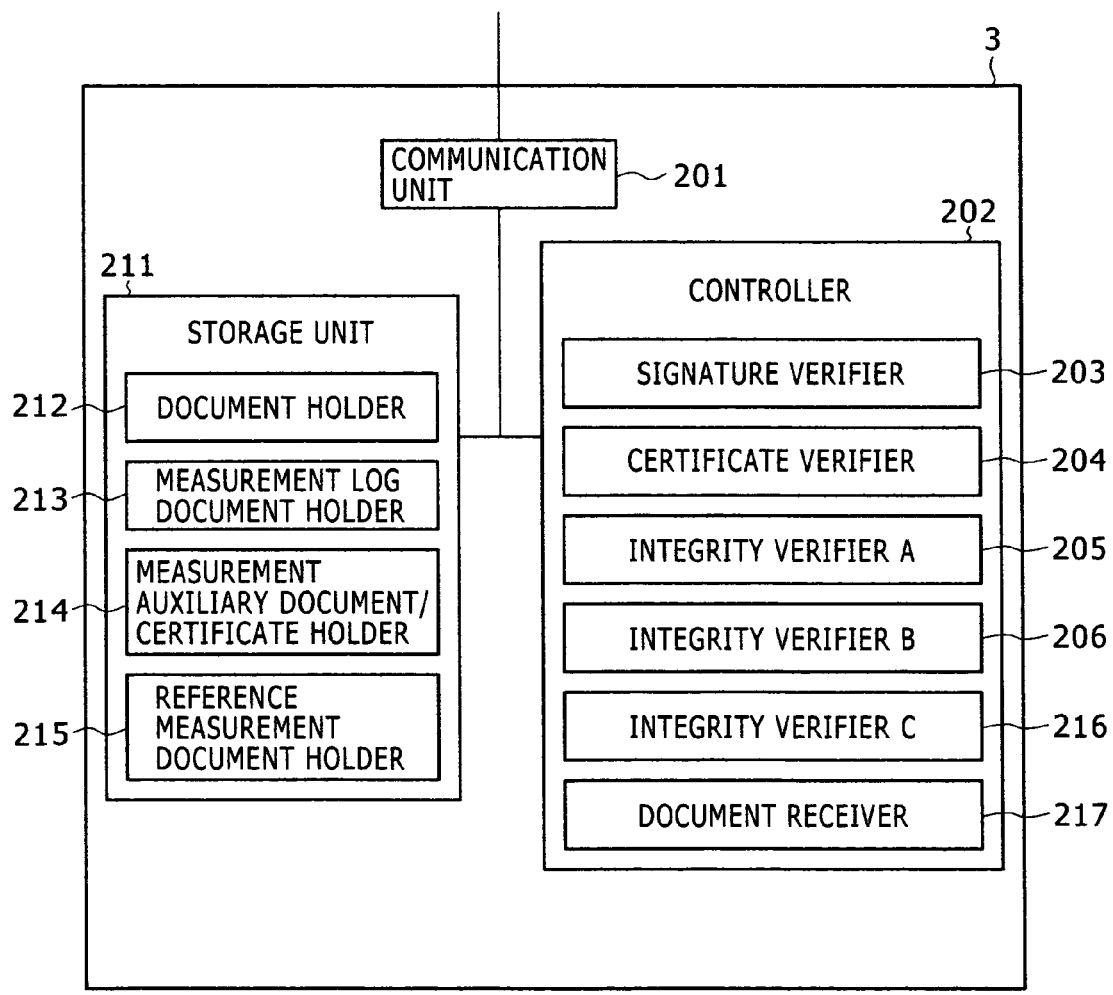
FIG. 19 is a block diagram showing an arrangement of modules in the managing unit 3 of the second embodiment.

FIG. 19 shows an arrangement of modules stored in the managing unit 3. In this drawing, the reference numeral 201 denotes a communication unit such as a network interface card, 202 denotes a controller such as a CPU, 203 denotes a signature verifier that verifies a signature granted to the measurement auxiliary document 134, 204 denotes a certificate verifier that verifies whether a public key certificate received from the managed unit 1 is reliable in the managing unit 3, 205 denotes an integrity verifier A to be described later, 206 denotes an integrity verifier B to be described later, 216 denotes an integrity verifier C to be described later, 217 denotes a document receiver that receives documents transmitted from the managed unit 1 and classifies/distributes the received documents to the integrity verifier A to integrity verifier C according to a flowchart to be described later, 211 denotes a storage unit such as a memory or HDD, 212 denotes a document holder that stores the log document 130, 213 denotes a measurement log document holder that stores the measurement log document 131, 214 denotes a measurement auxiliary document/certificate holder that stores the measurement auxiliary document 134 and a public key certificate, and 215 denotes a reference measurement document holder that stores the reference measurement document 135. Also, the managing unit 3, in advance before communicating with the managed unit 1, acquires the reference measurement document 135 from Web sites of plural software vendors and stores the reference measurement document 135 in the reference measurement document holder 215.

Although the log document 130 has been taken as an example of a log document in the present embodiment, the format of a log document is not limited to the format of the log document 130 as long as the log document includes all time information about times at which the managed unit 1 accesses the time distribution unit 2, and satisfies such a condition.

Although the log document 130 has been described in the present embodiment to be an access log created by the Web server in the managed unit 1, an application creating the log document is not necessarily limited to the Web server. Also, a contract document or the like may be taken as the log document 130 as long as it is a document in which time information is recorded.

Although the measurement log document 131 has been taken as an example of a measurement log document in the present embodiment, the format of a measurement log document is not limited to the format of the measurement log document 131 as long as the measurement log document is a document in which the same contents as those of the measurement log document 131 are recorded.

Although the measurement log document 131 has been described in the present embodiment to include a measurement log about the PCR[0] to PCR[4] and PCR[16], it may generally include PCR information of random numbers. However, the measurement log document 131 has to include PCR information which is requested by the managing unit 3. Also, a list of PCR numbers recorded in the measurement auxiliary document 134 must be the same as a list of PCR numbers recorded in the measurement log document 131. Further, in the present embodiment, the definition of a list of PCR numbers and application names of the respective numbers recorded in the measurement log document holder 144 will be referred to as an information class. The managed unit 1 and the managing unit 3 need to information-share the information class before step 401 is performed.

Although the measurement auxiliary document 134 has been taken as an example of a measurement auxiliary document in the present embodiment, the format of a measurement auxiliary document is not limited to the format of the measurement auxiliary document 134 as long as the measurement auxiliary document is a document in which the same contents as those of the measurement auxiliary document 134 are recorded.

Although the reference measurement document 135 has been taken as an example of a reference measurement document in the present embodiment, the format of a reference measurement document is not limited to the format of the reference measurement document 135 as long as the reference measurement document is a document in which the same contents as those of the reference measurement document 135 are recorded.

Although the ROM 158 has been described in the present embodiment to be included in the managed unit 1, it is not limited in number as long as it is one or more in number. However, in this case, when the managed unit 1 is started, hash values in all ROMs must be calculated and then stored in the measurement log document holder 144 and hash value holder 171.

Although the 24 PCRs have been described in the present embodiment to be included in the hash value holder 171, the PCRs are not limited in number.

Although the 24 PCR values have been described in the present embodiment to be reset to 0 at the same time that the managed unit 1 is restarted, they may be reset to a different value when the managed unit 1 is restarted. Also, the PCR values may be reset to different values by PCR numbers when the managed unit 1 is restarted.

Although the hash value calculation/storage unit 154, hash value calculation/storage unit 159 and hash value calculation/storage unit 161 have been described in the present embodiment to use SHA1 as the hash function, they may use other hash functions. However, in this case, the size of a memory per one PCR in the hash value holder 171 must be equal to that of a value of a hash function used, not 20 bytes.

Although the tamper-resistant device 163 has been assumed in the present embodiment to be Trusted Platform Module (TPM) version 1.2, it is not necessarily limited to the TPM as long as it has the same function as that of the tamper-resistant device 163.

Although the source of acquisition of the reference measurement document 135 by the managing unit 3 has been specified as Web sites of plural software vendors in the present embodiment, the method for acquisition of the reference measurement document 135 is not limited thereto. For example, in the case where the managed unit 1 and the managing unit 3 are present in the same Intranet environment, an Intranet manager may realize the above by creating the managed unit 1 under the secure condition that any software is not tampered at all, acquiring desired hash value data from the managed unit, creating the reference measurement document 135 based on the hash value data, and storing the reference measurement document 135 in the reference measurement document holder 215.

Next, a starting process of the managed unit 1 according to the present embodiment will be described with reference to FIG. 20.

When the user of the managed unit 1 powers on the managed unit 1, all PCR values in the hash value holder 171 are reset to 0. Then, the boot block 160 in the ROM 158 is run first of all, and the hash value calculation/storage unit 161 calculates hash values of all files in the boot block 160 (Step 301), records identifiers of the files and the hash values in the measurement log document 131 in the measurement log document holder 144, and stores the hash values in the PCR[0] of the hash value holder 171 (Step 302). In the case where the files are plural in number, the value of the PCR[0] is updated according to the following equation A.

$$\text{Value of } PCR[i] \text{ after update} = SHA1 \text{ (value to be added} | \text{value of } PCR[i] \text{ before update) } (i=0, 1, \ldots, 23) \quad (A)$$

where SHA1 (X) means that the hash function of SHA1 is executed with respect to a factor X.

Then, the hash value calculation/storage unit 161 calculates hash values of all files other than those of the boot block 160, existing in the ROM 158 (Step 303), records identifiers of the files and the hash values in the measurement log document 131 in the measurement log document holder 144, and stores the hash values in the PCR[1] of the hash value holder 171 (Step 304). In the case where the files are plural in number, the value of the PCR[1] is updated according to the above equation A.

Then, the boot block 160 loads the file group on a main memory and executes execution codes of the files.

Thereafter, the hash value calculation/storage unit 159 calculates hash values of all files corresponding to an operating system (OS) loader, among files stored in a nonvolatile area of the storage unit 141 (Step 305), records identifiers of the files and the hash values in the measurement log document 131 in the measurement log document holder 144, and stores the hash values in the PCR[2] of the hash value holder 171 (Step 306). In the case where the files are plural in number, the value of the PCR[2] is updated according to the above equation A.

Then, the ROM 158 loads the file group on the main memory and runs the OS loader.

Thereafter, the OS loader calculates hash values of all files corresponding to an OS kernel, among the files stored in the nonvolatile area of the storage unit 141 (Step 307), records identifiers of the files and the hash values in the measurement log document 131 in the measurement log document holder 144, and stores the hash values in the PCR[3] of the hash value holder 171 (Step 308). In the case where the files are plural in number, the value of the PCR[3] is updated according to the above equation A.

Then, the OS loader loads the file group on the main memory and runs the OS kernel.

Thereafter, the OS kernel calculates hash values of all files belonging to software called Platform Trust Services (PTS), among the files stored in the nonvolatile area of the storage unit 141 (Step 309), records identifiers of the files and the hash values in the measurement log document 131 in the measurement log document holder 144, and stores the hash values in the PCR[4] (Step 310). In the case where the files are plural in number, the value of the PCR[4] is updated according to the above equation A.

Then, the OS kernel loads the file group on the main memory and runs the PTS.

Thereafter, the PTS, whenever application software is run, calculates hash values of all files belonging to the application software (Step 311), records identifiers of the files and the hash values in the measurement log document 131 in the measurement log document holder 144, and stores the hash values in the hash value holder 171 (Step 312).

In the above description, only the PCR[0], PCR[1], PCR[2], PCR[3], PCR[4] and PCR[16] are used and the PCRs of the other numbers are not used. This is based on the information class information-shared between the managed unit 1 and the managing unit 3 before step 401, as stated previously. Also, a definition about what information is stored in each of the PCR[0], PCR[1], PCR[2], PCR[3], PCR[4] and PCR[16] is based on the information class. For example, assuming that hash values of only Web application-associated software, such as a Web server, Web application server and database, are stored in the PCR[16], a hash value of software operating in association with the application software is stored in the PCR of the same number according to the above-stated equation A.

According to the information class, the measurement log document holder 144 and the hash value holder 171 do not need to hold information about the PCRs of the other numbers, PCR[5] to PCR[15] and PCR[17] to PCR[23], and the amount of information of the PCR[0], PCR[1], PCR[2], PCR[3], PCR[4] and PCR[16] held in the measurement log document holder 144 and the hash value holder 171 can also be limited to a minimum amount desired by the managing unit 3. Conventionally, even information not based on the information class is stored in the measurement log document holder 144. However, by storing only information based on the information class in the measurement log document holder 144, it is possible to realize the configuration of the present embodiment even in the case where the managed unit 1 is a unit having an insufficient writable storage capacity, such as a specific dedicated terminal or a mobile phone with a small storage capacity.

Through a series of processes described above, the operations of the hash value calculation/storage unit 154, hash value calculation/storage unit 159 and hash value calculation/storage unit 161 calculating hash values of software until the PTS is run, hash values of the PTS and hash values of application software pre-specified by the manager, storing identifiers of the files and the hash values in the measurement log document holder 144, and storing the hash values in the hash value holder 171 are completed.

On the other hand, malware, such as virus or spyware, invaded the managed unit 1 may easily tamper the measurement log document 131 in the measurement log document holder 144 after application software is run. However, because the PCR value in the hash value holder 171 is always calculated based on the above-stated equation A, the virus or spyware cannot intentionally change the PCR value to a specific value.

Figure 20:
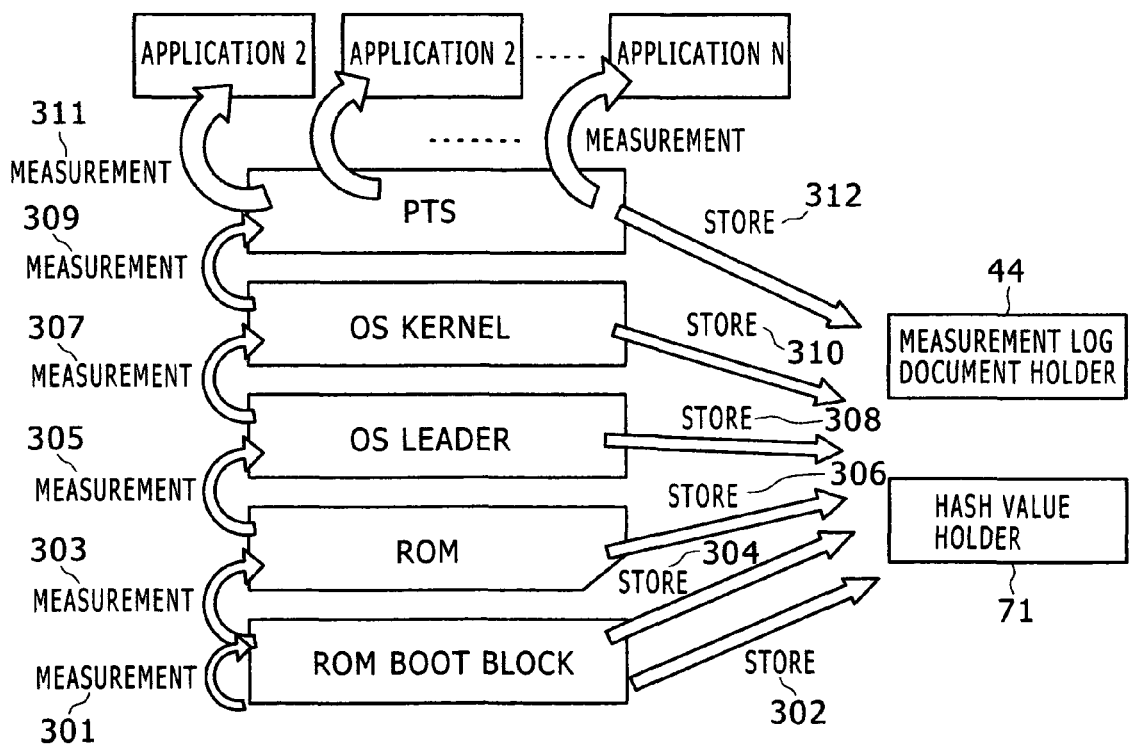
FIG. 20 is a view illustrating calculation of hash values of respective modules in the managed unit 1 and storage of the hash values in a measurement log document holder 144 and a hash value holder 171 when the managed unit 1 of the second embodiment is started.

Although the running order of plural software modules in the managed unit 1 has been specified in FIG. 20 in the present embodiment, it will be understood that each software module does not need to be run in the order of FIG. 20.

Although software modules running in the managed unit 1 have been specified as shown in FIG. 20 in the present embodiment, the number of software modules measured in running or the number of measurement steps from the ROM boot block to each application does not need to be equal to that in FIG. 20. For example, the ROM may, in place of the OS loader, calculate hash values of the PTS or application and store the hash values in the measurement log document holder 144 or hash value holder 171.

Although the hash values of the boot block, ROM, OS loader, OS kernel and PTS have been stored respectively in the PCR[0], PCR[1], PCR[2], PCR[3] and PCR[4] in the present embodiment, the managed unit 1 may store the hash values in PCRs of different numbers as long as the managing unit 3 can carry out the integrity verification A, integrity verification B and integrity verification C to be described later, using a measurement log document and measurement auxiliary document received from the managed unit 1.

Although hash values of all application software run by the PTS have been described in the present embodiment to be calculated and stored in the measurement log document holder 144, the managed unit 1 does not need to store information other than information requested by the managing unit 3 in the measurement log document holder 144 in the case where the managed unit 1 is a unit having an insufficient writable storage capacity, such as a specific dedicated terminal or a mobile phone with a small storage capacity. That is, it is possible to limit the types of application software whose hash values are to be calculated by the PTS. For example, in the case where the managing unit 3 intends to verify the operating state of the Web server system, the PTS may calculate hash values of only application software belonging to the Web server system and store the hash values in the measurement log document holder 144 and the PCR[16] of the hash value holder 171.

Figure 21:
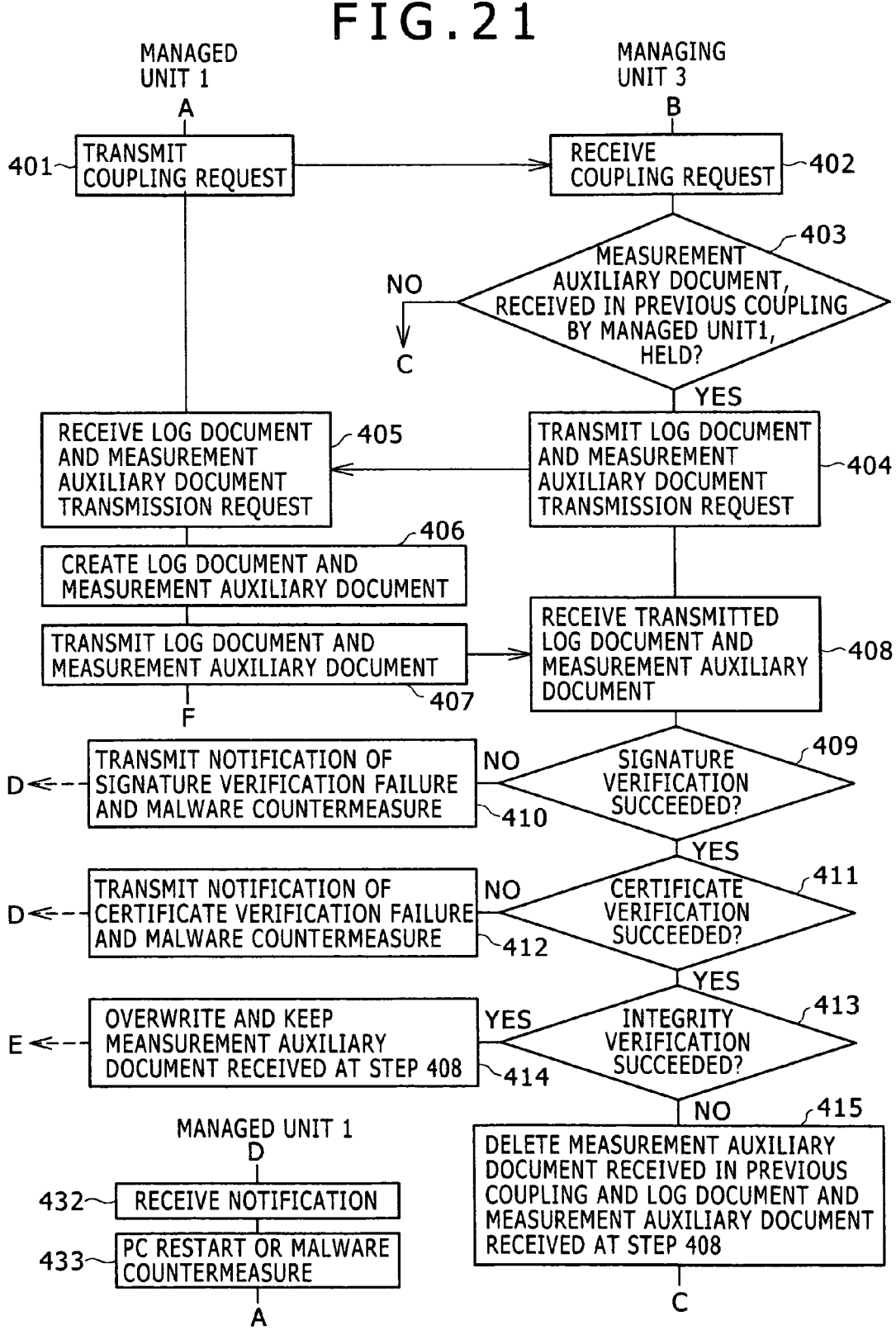
FIG. 21 is a view illustrating the first half of a flowchart after the managing unit 3 of the second embodiment receives a coupling request from the managed unit 1.
Figure 22:
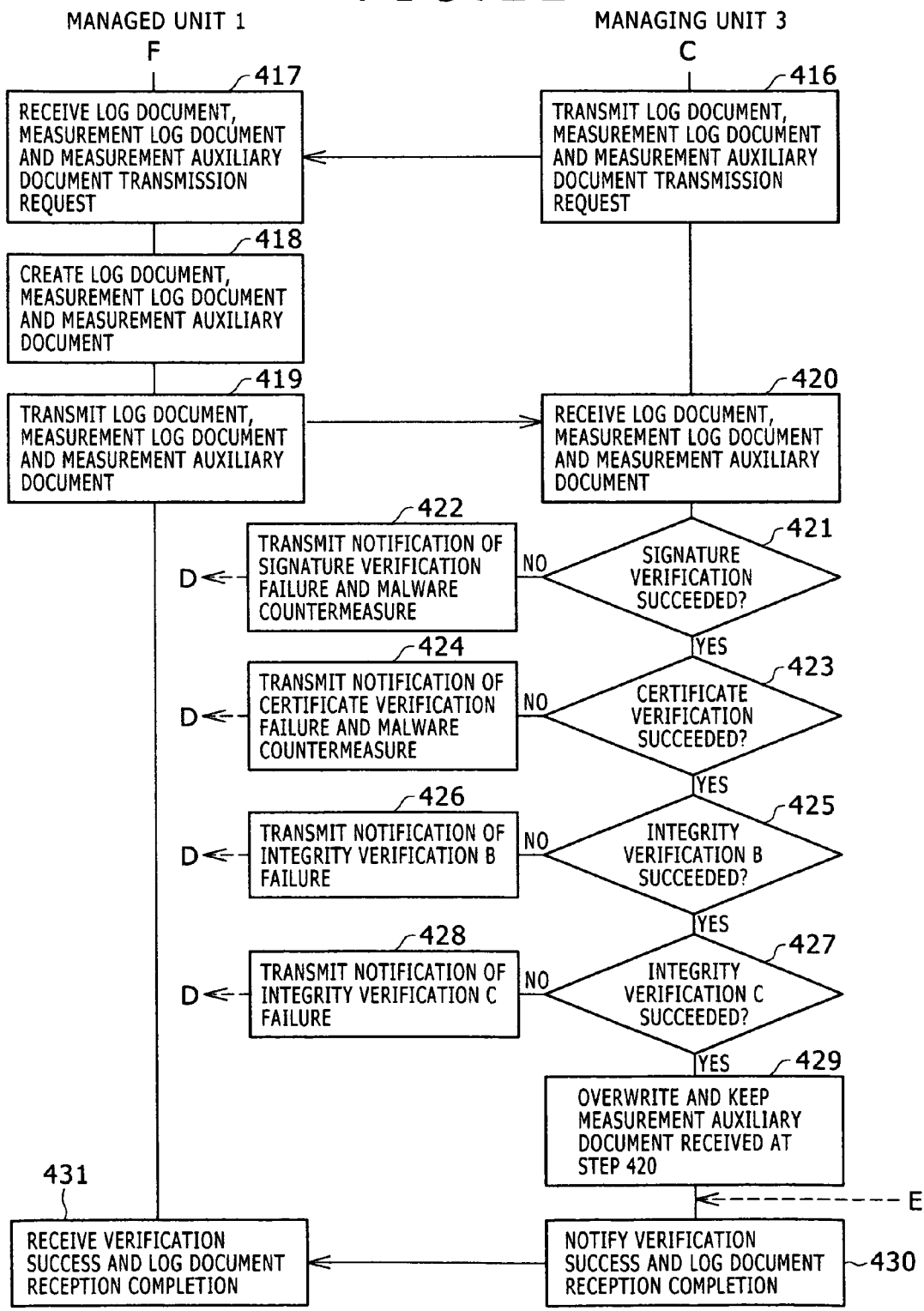
FIG. 22 is a view illustrating the second half of the flowchart after the managing unit 3 of the second embodiment receives the coupling request from the managed unit 1.

Hereinafter, a process until the managed unit 1 transmits a log document to the managing unit 3 and the managing unit 3 trusts and accepts the contents of the log document after receiving the log document will be described with reference to FIGS. 21 and 22 which illustrate a workflow of the managing unit 3.

The document transmitter 155 transmits a coupling request to the document receiver 217 of the managing unit 3 (Step 401). Then, the managing unit 3 receives the coupling request (Step 402). Thereafter, the document receiver 217 searches the measurement auxiliary document/certificate holder 214 to determine whether a measurement auxiliary document previously received from the managed unit 1 has been stored in the measurement auxiliary document/certificate holder 214 (Step 403). When this document has not been stored in the managing unit 3 (No at step 403), the document receiver 217 proceeds to step 416.

When the above document has been stored in the managing unit 3 (Yes at step 403), the document receiver 217 generates a random number, transmits the generated random number to the document transmitter 155 and, at the same time, requests the document transmitter 155 to transmit a log document and measurement auxiliary document (Step 404). Subsequently, the document transmitter 155 receives the random number and the request (Step 405). Then, the document transmitter 155 creates the log document and measurement auxiliary document (Step 406).

Details of the log document and measurement auxiliary document creating process (Step 406) are as follows. First, the document transmitter 155 extracts a log document 130 stored in the document holder 143, combines this document with the random number received at step 405 and delivers the combined document to the measurement auxiliary document creator 156. Then, the measurement auxiliary document creator 156 sends the combined document to the signature target data creator 169 via the signature executor 168. Then, the signature target data creator 169 extracts, from the hash value holder 171, information of the PCR[0] to PCR[4] in which hash value information of the ROM boot block, ROM, OS loader, OS kernel and PTS is stored and information of the PCR[16] in which hash value information of files associated with the Web server system is stored, combines the combined document with the extracted information, and stores the combined information as signature target data in the signature target data holder 172. Thereafter, the signature executor 168 executes a digital signature with respect to the signature target data in the signature target data holder 172 using a key stored in the key/certificate holder 173 and creates a digital signature value. Finally, the signature executor 168 combines the signature target data with the digital signature value to create a measurement auxiliary document 134, and sends the measurement auxiliary document and public key certificate to the document transmitter 155 via the measurement auxiliary document creator 156. The above is the details of the process of creating the log document and measurement auxiliary document by the document transmitter 155.

Then, the document transmitter 155 transmits the log document 130, measurement auxiliary document 134 and public key certificate to the document receiver 217 (Step 407). The document receiver 217 receives the log document 130, measurement auxiliary document 134 and public key certificate (Step 408). Thereafter, the signature verifier 203 receives the random number generated at step 404 from the document receiver 217 and then performs signature verification with respect to the measurement auxiliary document 134 in the measurement auxiliary document/certificate holder 214 (Step 409). When the signature verifier 203 fails in the signature verification (No at step 409), the managing unit 3 transmits a document in which the signature verification failure and malware countermeasure are recorded, to the managed unit 1 (Step 410), and then proceeds to step 432.

When the signature verifier 203 succeeds in the signature verification (Yes at step 409), the certificate verifier 204 performs certificate verification with respect to the public key certificate in the measurement auxiliary document/certificate holder 214 (Step 411). When the certificate verifier 204 fails in the certificate verification (No at step 411), the managing unit 3 transmits a document in which the certificate verification failure and malware countermeasure are recorded, to the managed unit 1 (Step 412), and then proceeds to step 432.

Figure 23:
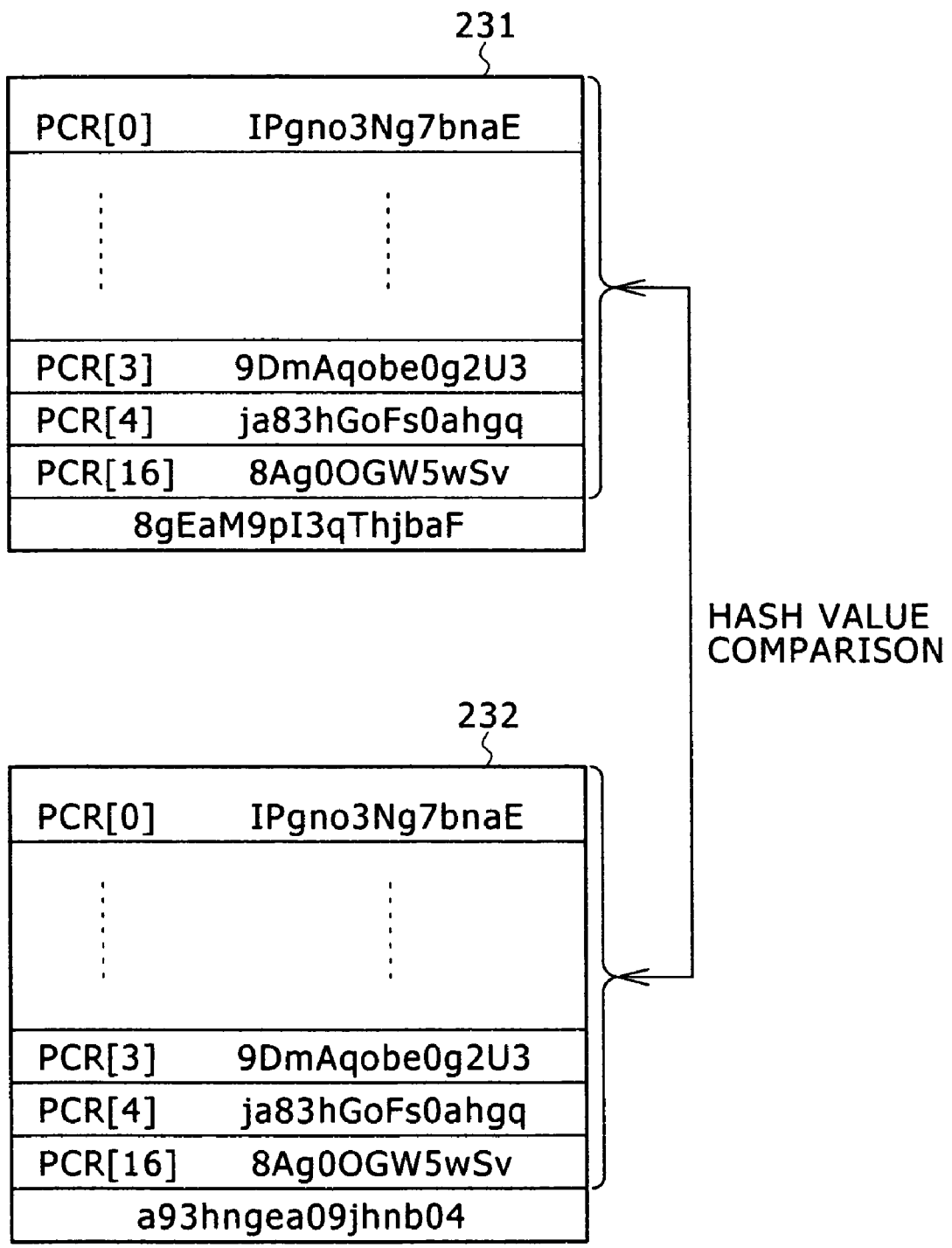
FIG. 23 is a view illustrating the contents of integrity verification A of the second embodiment.

When the certificate verifier 204 succeeds in the certificate verification (Yes at step 411), the integrity verifier A 205 performs the integrity verification A. The integrity verification A (see FIG. 23) is that the integrity verifier A 205 determines whether hash values of the PCR[0] to PCR[4] and PCR[16] are equal between a measurement auxiliary document 231 held by the managing unit 3 after the previous coupling of the managed unit 1 and a measurement auxiliary document 232 received by the managing unit 3 at step 408. When the integrity verifier A 205 succeeds in the integrity verification A (Yes at step 413), the managing unit 3 deletes the measurement auxiliary document received in the previous coupling, stores the measurement auxiliary document received at step 408 (Step 414) and then proceeds to step 430.

When the integrity verifier A 205 fails in the integrity verification A (No at step 413), the managing unit 3 deletes the measurement auxiliary document received in the previous coupling and the log document and measurement auxiliary document received at step 408 (Step 415).

Thereafter, the document receiver 217 generates a random number and, at the same time, requests the document transmitter 155 to transmit a log document, measurement log document and measurement auxiliary document (Step 416). Subsequently, the document transmitter 155 receives the request (Step 417). Then, the document transmitter 155 creates the log document, measurement log document and measurement auxiliary document (Step 418). The log document and measurement auxiliary document creating method at step 418 is the same as that at step 406. The measurement log document creating process is the same as extracting a measurement log document 131 stored in the measurement log document holder 144 by the document transmitter 155.

Then, the document transmitter 155 transmits the log document 130, measurement log document 131, measurement auxiliary document 134 and public key certificate to the document receiver 217 (Step 419). The document receiver 217 receives the log document, measurement log document, measurement auxiliary document and public key certificate (Step 420). Thereafter, the signature verifier 203 receives the random number generated at step 416 from the document receiver 217 and then performs signature verification with respect to the measurement auxiliary document 134 in the measurement auxiliary document/certificate holder 214 (Step 421). When the signature verifier 203 fails in the signature verification (No at step 421), the managing unit 3 transmits a document in which the signature verification failure and malware countermeasure are recorded, to the managed unit 1 (Step 422), and then proceeds to step 432.

When the signature verifier 203 succeeds in the signature verification (Yes at step 421), the certificate verifier 204 performs certificate verification with respect to the public key certificate in the measurement auxiliary document/certificate holder 214 (Step 423). When the certificate verifier 204 fails in the certificate verification (No at step 423), the managing unit 3 transmits a document in which the certificate verification failure and malware countermeasure are recorded, to the managed unit 1 (Step 424), and then proceeds to step 432.

When the certificate verifier 204 succeeds in the certificate verification (Yes at step 423), the integrity verifier B 206 performs the integrity verification B. The integrity verification B (see FIG. 24) is a process of determining whether the managing unit 3 can reconstruct hash values in the measurement auxiliary document 134 using hash value information recorded in the measurement log document 131. For example, in the case of the PCR[16], the integrity verifier B 206 obtains Hash16_cal by executing the following equation using the hash value information in the measurement log document 131.

$$\text{Hash16\_cal}=SHA(\text{Hash16}\_N|SHA(\text{Hash16}\_{N-1}|\ldots SHA(\text{Hash16,3}|SHA(\text{Hash16,2}|\text{Hash16,1}))\ldots)) \quad (B)$$

Then, the integrity verifier B 206 compares the value of the PCR[16] recorded in a measurement auxiliary document 244 with the Hash16_cal to determine whether the two values are equal. This verification is equally performed in association with all PCR numbers in the measurement log document 131. When all the PCR values are equal to the corresponding values, the verification succeeds. When the integrity verifier B 206 fails in the integrity verification B (No at step 425), the managing unit 3 transmits a document in which the integrity verification B failure and a failed PCR number are recorded, to the managed unit 1 (Step 426), and then proceeds to step 432.

When the integrity verifier B 206 succeeds in the integrity verification B (Yes at step 425), the integrity verifier C 207 performs the integrity verification C. The integrity verification C is a process of determining whether the hash values in the measurement log document 131 and the hash values in the reference measurement document are all equal. For example, with regard to TimeClient which is application software in the managed unit 1, a determination is made as to whether hash value information recorded in a measurement log document 241 and hash value information recorded in a reference measurement document 245 of the TimeClient are equal (see FIG. 25). Similarly, this process is carried out in association with all other reference measurement documents 245 held in the reference measurement document holder 215 to determine whether hash values are all equal. When the integrity verifier C 207 fails in the integrity verification C (No at step 427), the managing unit 3 transmits a document in which the integrity verification C failure and a failed application name are recorded, to the managed unit 1 (Step 428), and then proceeds to step 432.

When the integrity verifier C 207 succeeds in the integrity verification C (Yes at step 427), the managing unit 3 overwrites the measurement auxiliary document 244 received at step 420 in the measurement auxiliary document/certificate holder 214 (Step 429). Then, the document receiver 217 transmits a document in which all verification success and log document acceptance completion are recorded, to the document transmitter 155 (Step 430). Finally, the document transmitter 155 receives this document (Step 431). Through a series of processes described above, the managed unit 1 integrity verification and log document acceptance by the managing unit 3 are completed.

Although the managing unit 3 has been described in the present embodiment to verify the integrities of the log document 130, measurement log document 131 and measurement auxiliary document 134, it may not necessarily perform the above-stated verification processes. For example, the managing unit 3 may entrust some or all of the aforementioned verification processes to a different unit on the Internet or Intranet, trusted thereby.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An authentication system comprising a document creation unit including a processor, a storage unit and a tamper-resistant device, a time distribution unit, and a document reception unit, the document creation unit, the time distribution unit and the document reception unit being coupled via a communication line,
   wherein the processor of the document creation unit calculates hash values of all software modules running in the document creation unit when the document creation unit is started, stores the hash values and information for identification of the hash values in the storage unit, and transmits the hash values to the tamper-resistant device to store the hash values in a storage area of the tamper-resistant device,
   wherein the processor stores time information increasing at regular intervals in the storage unit and, when an electronic document is created, additionally records the stored time information in the electronic document,
   wherein the processor receives latest time information from the time distribution unit, overwrites the stored time information with the latest time information and additionally records the latest time information in the electronic document,
   wherein the processor requests the tamper-resistant device to execute a digital signature immediately after additionally recording the latest time information in the electronic document,
   wherein the tamper-resistant device, in response to the request, combines the hash values stored in the storage area to create one piece of measurement auxiliary information, executes the digital signature with respect to information including the measurement auxiliary information using a key held in the device to obtain a digital signature value, and outputs the measurement auxiliary information, the digital signature value and a public key certificate corresponding to the key to the processor, and
   wherein the processor creates a measurement auxiliary document with the received measurement auxiliary information, digital signature value and latest time information.

2. The authentication system according to claim 1,
   wherein the processor transmits log information stored in the storage unit to the tamper-resistant device when requesting the tamper-resistant device to execute the digital signature, and
   wherein the tamper-resistant device executes the digital signature with respect to combined information of the log information and the measurement auxiliary information.

3. The authentication system according to claim 1,
   wherein the document creation unit creates a log document with a combination of log information and a measurement log document with a combination of the hash values and hash value identification information stored in the storage unit,
   wherein the document creation unit transmits the log document, the measurement log document, the measurement auxiliary document and the public key certificate to the document reception unit,
   wherein the document reception unit includes a communication unit coupled to a network, and receives the log document, the measurement log document, the measurement auxiliary document and the public key certificate from the document creation unit through the communication unit.

4. The authentication system according to claim 3,
   wherein the document reception unit further includes a controller for executing a function of verifying authenticity of the digital signature, a function of verifying authenticity of the public key certificate, a function of calculating and comparing the hash values, and a function of verifying security policy conformity, and
   wherein the controller verifies authenticity of the digital signature value granted to the measurement auxiliary document, verifies authenticity of the received public key certificate, verifies whether there is no contradiction between the hash values recorded in the measurement log document and the hash values recorded in the measurement auxiliary document, verifies whether a plurality of hash values recorded in a reference measurement document stored in the document reception unit and the hash values recorded in the measurement log document are all equal, and verifies whether the measurement log document violates a security policy stored in the document reception unit.

5. A document creation unit comprising a processor, a storage unit, a tamper-resistant device, and a communication unit,
   wherein the processor creates an electronic document,
   wherein the processor calculates hash values of all software modules running in the processor, stores the hash values in a storage area of the tamper-resistant device and stores the hash values and information for identification of the hash values in the storage unit,
   wherein the processor stores time information increasing at regular intervals in the storage unit, wherein the processor additionally records the time information stored in the storage unit in the electronic document, wherein the processor receives latest time information from the time distribution unit through the communication unit, wherein the processor overwrites the time information stored in the storage unit with the received latest time information, wherein the processor additionally records the latest time information in the electronic document, wherein the processor requests the tamper-resistant device to execute a digital signature immediately after additionally recording the latest time information in the electronic document, wherein the tamper-resistant device, in response to the request, combines the hash values stored in the storage area to create one piece of measurement auxiliary information, executes the digital signature with respect to information including the measurement auxiliary information using a key held in the device to obtain a digital signature value, and outputs the measurement auxiliary information, the digital signature value and a public key certificate corresponding to the key to the processor, wherein the processor transmits log information associated with the electronic document to the tamper-resistant device when requesting the tamper-resistant device to execute the digital signature, and wherein the processor creates a measurement auxiliary document with the received measurement auxiliary information, digital signature value and latest time information.

6. The document creation unit according to claim 5, wherein the processor creates a measurement log document by combining the hash values and hash value identification information stored in the storage unit, and creates a measurement auxiliary document with the measurement auxiliary information and digital signature value received from the tamper-resistant device and the latest time information, and wherein the processor transmits a log document with a combination of the log information, the measurement log document, the measurement auxiliary document, and the public key certificate to a network through the communication unit.

* * * * *